(12) United States Patent
Lee et al.

(10) Patent No.: US 12,235,518 B2
(45) Date of Patent: Feb. 25, 2025

(54) LENS ASSEMBLY

(71) Applicants: Sintai Optical (Shenzhen) Co., Ltd., Guandong (CN); Asia Optical Co., Inc., Taichung (TW)

(72) Inventors: Tsan-Haw Lee, Taichung (TW); Rong-Shun Syu, Taichung (TW)

(73) Assignees: SINTAI OPTICAL (SHENZHEN) CO., LTD., Shenzhen (CN); ASIA OPTICAL CO., INC., Taichung (TW)

(*) Notice: Subject to any disclaimer, the term of this patent is extended or adjusted under 35 U.S.C. 154(b) by 508 days.

(21) Appl. No.: 17/543,868

(22) Filed: Dec. 7, 2021

(65) Prior Publication Data

US 2022/0187569 A1 Jun. 16, 2022

(30) Foreign Application Priority Data

Dec. 16, 2020 (CN) .......................... 202011481740.3
Dec. 21, 2020 (CN) .......................... 202011516284.1

(51) Int. Cl.
*G02B 9/64* (2006.01)

(52) U.S. Cl.
CPC ..................................... *G02B 9/64* (2013.01)

(58) Field of Classification Search
CPC .............................. G02B 9/64; G02B 13/0045
See application file for complete search history.

(56) References Cited

U.S. PATENT DOCUMENTS

| | | | |
|---|---|---|---|
| 3,563,636 A * | 2/1971 | Macher | G02B 15/145125 |
| | | | 359/683 |
| 5,949,589 A | 9/1999 | Nakazawa | |
| 6,512,633 B2 | 1/2003 | Konno et al. | |
| 6,801,373 B2 | 10/2004 | Reinecke et al. | |
| 7,660,048 B1 | 2/2010 | Kozodoi | |
| 8,976,454 B2 | 3/2015 | Nagatoshi et al. | |
| 9,122,045 B2 | 9/2015 | Amano | |
| 9,851,529 B2 | 12/2017 | Asami | |
| 11,054,619 B2 | 7/2021 | Lee | |
| 2013/0242175 A1* | 9/2013 | Kuzuhara | G02B 27/646 |
| | | | 348/360 |

(Continued)

FOREIGN PATENT DOCUMENTS

| | | |
|---|---|---|
| CN | 107305276 A | 10/2017 |
| CN | 108318994 A | 7/2018 |

(Continued)

*Primary Examiner* — George G. King
(74) *Attorney, Agent, or Firm* — McClure, Qualey & Rodack, LLP

(57) ABSTRACT

A lens assembly includes a first lens, a second lens, a third lens, a fourth lens, a fifth lens, a sixth lens, a seventh lens, an eighth lens, and a ninth lens, all of which are arranged in order from an object side to an image side along an optical axis. The first, second, seventh, and eighth lenses are with refractive power. The third lens is with negative refractive power and includes a concave surface facing the object side. The fourth lens is with positive refractive power. The fifth lens is with positive refractive power and includes a convex surface facing the object side. The sixth lens is with positive refractive power and includes a convex surface facing the image side. The ninth lens is with positive refractive power and includes a convex surface facing the object side. An air gap is disposed between the sixth lens and the seventh lens.

16 Claims, 30 Drawing Sheets

(56) References Cited

U.S. PATENT DOCUMENTS

| | | | |
|---|---|---|---|
| 2016/0170175 A1* | 6/2016 | Chang | G02B 13/0045 |
| | | | 359/708 |
| 2019/0004296 A1* | 1/2019 | Sugita | G02B 15/20 |
| 2019/0064491 A1* | 2/2019 | Sugita | G02B 15/1461 |
| 2020/0096746 A1* | 3/2020 | Shih | G02B 13/04 |
| 2020/0285028 A1 | 9/2020 | Hirano | |
| 2021/0181466 A1* | 6/2021 | Lee | G02B 13/04 |
| 2022/0334365 A1* | 10/2022 | Yamashita | G02B 15/145523 |

FOREIGN PATENT DOCUMENTS

| | | |
|---|---|---|
| CN | 109407281 A | 3/2019 |
| CN | 110879458 A | 3/2020 |
| CN | 111538133 A | 8/2020 |
| CN | 111596442 A | 8/2020 |
| EP | 3006977 A2 | 8/2015 |
| JP | 2000162499 A | 6/2000 |
| JP | 2002365541 A | 12/2002 |
| JP | 2016090725 A | 5/2016 |
| JP | 2018155776 A | 10/2018 |
| JP | 2020126183 A | 8/2020 |
| KR | 20000050837 A | 8/2000 |
| TW | I676835 B | 11/2019 |

* cited by examiner

LENS ASSEMBLY

BACKGROUND OF THE INVENTION

Field of the Invention

The invention relates to a lens assembly.

Description of the Related Art

The current development trend of a lens assembly is toward miniaturization. Additionally, the lens assembly is developed to have small F-number and high resolution in accordance with different application requirements. However, the known lens assembly can't satisfy such requirements. Therefore, the lens assembly needs a new structure in order to meet the requirements of miniaturization, small F-number, and high resolution at the same time.

BRIEF SUMMARY OF THE INVENTION

The invention provides a lens assembly to solve the above problems. The lens assembly of the invention is provided with characteristics of a shortened total lens length, a decreased F-number, an increased resolution, and still has a good optical performance.

The lens assembly in accordance with an exemplary embodiment of the invention includes a first lens, a second lens, a third lens, a fourth lens, a fifth lens, a sixth lens, a seventh lens, an eighth lens, and a ninth lens. The first lens is a meniscus lens with refractive power. The second lens is with refractive power. The third lens is with negative refractive power and includes a concave surface facing an object side. The fourth lens is with positive refractive power. The fifth lens is with positive refractive power and includes a convex surface facing the object side. The sixth lens is with positive refractive power and includes a convex surface facing an image side. The seventh lens is with refractive power. The eighth lens is with refractive power. The ninth lens is with positive refractive power and includes a convex surface facing the object side. The first lens, the second lens, the third lens, the fourth lens, the fifth lens, the sixth lens, the seventh lens, the eighth lens, and the ninth lens are arranged in order from the object side to the image side along an optical axis. An air gap is disposed between the sixth lens and the seventh lens.

In another exemplary embodiment, the refractive power of the seventh lens and the refractive power of the eighth lens are opposite in sign.

In yet another exemplary embodiment, the fourth lens includes a convex surface facing the object side, the sixth lens further includes another convex surface facing the object side, and the eighth lens includes a convex surface facing the image side.

In another exemplary embodiment, the lens assembly further includes a stop disposed between the fourth lens and the sixth lens, wherein the refractive power of the first lens and the refractive power of the second lens are opposite in sign, the first lens includes a convex surface facing the object side and a concave surface facing the image side, the second lens is a meniscus lens and includes a convex surface facing the object side and a concave surface facing the image side, the third lens is a biconcave lens and further includes another concave surface facing the image side, and the fourth lens is a biconvex lens and further includes another convex surface facing the image side.

In yet another exemplary embodiment, the lens assembly satisfies at least one of the following conditions: Vd4>35; 10 mm<$f_4-R_{k2}$<56.5 mm; $-22<(R_{m2}+f_1)/f_k<-1$; $-5.2<(R_{k2}-R_{m2})/f_e<37.6$; $-4.3<(R_{41}-R_{82})/f_4<25$; $1.15 \leq f_{34}/f_{67} \leq 1.80$; Vd2<30; $2.7 \leq TTL/R_{11} \leq 3.0$; $0.65 \leq f/f_5 \leq 0.8$; 48 mm<$f_1+f_4$<108 mm; $2.4<TTL/f_r<2.7$; $-10$ mm<$f_e-f_k$<10 mm; 50 mm<$f_1-f_k$<100 mm; $-2.2<R_{k2}/(f_1+f_k)<0.13$; $0.4<R_{11}/R_{12}<0.8$; 3.1 mm<$R_{11}+R_{31}$<12.2 mm; $-0.31<R_{31}/f_1<-0.13$; wherein Vd4 is an Abbe number of the fourth lens, $f_4$ is an effective focal length of the fourth lens, $R_{k2}$ is a radius of curvature of an image side surface of the lens second close to the image side, $f_1$ is an effective focal length of the first lens, $f_k$ is an effective focal length of the lens second close to the image side, $R_{m2}$ is a radius of curvature of an image side surface of the lens closest to the image side, $f_e$ is an effective focal length of the lens fifth close to the image side, $R_{41}$ is a radius of curvature of an object side surface of the fourth lens, $R_{82}$ is a radius of curvature of an image side surface of the eighth lens, $f_{34}$ is an effective focal length of a combination of the third lens and the fourth lens, $f_{67}$ is an effective focal length of a combination of the sixth lens and the seventh lens, Vd2 is an Abbe number of the second lens, $f_5$ is an effective focal length of the fifth lens, f is an effective focal length of the lens assembly, $R_{11}$ is a radius of curvature of an object side surface of the first lens, TTL is an interval from an object side surface of the first lens to an image plane along the optical axis, $f_r$ is an effective focal length of a combination of the tenth lens, the sixth lens, the seventh lens, the eighth lens, and the ninth lens, $R_{12}$ is a radius of curvature of an image side surface of the first lens, and $R_{31}$ is a radius of curvature of an object side surface of the third lens.

In another exemplary embodiment, the sixth lens is a meniscus lens and further includes a concave surface facing the object side, the seventh lens is a biconvex lens and includes a convex surface facing the object side and another convex surface facing the image side, and the eighth lens includes a concave surface facing the object side.

In yet another exemplary embodiment, the lens assembly further includes a stop disposed between the fourth lens and the sixth lens, wherein the refractive power of the first lens and the refractive power of the second lens are opposite in sign, the first lens includes a convex surface facing the object side and a concave surface facing the image side, the second lens is a meniscus lens and includes a convex surface facing the object side and a concave surface facing the image side, the third lens is a biconcave lens and further includes another concave surface facing the image side, and the fourth lens includes a convex surface facing the image side.

In another exemplary embodiment, the lens assembly further includes a tenth lens disposed between the fifth lens and the sixth lens, wherein the tenth lens is a biconcave lens with negative refractive power and includes a concave surface facing the object side and another concave surface facing the image side.

In yet another exemplary embodiment, the lens assembly further includes a tenth lens disposed between the fifth lens and the sixth lens, wherein the tenth lens is with negative refractive power.

In another exemplary embodiment, the tenth lens is a biconcave lens and includes a concave surface facing the object side and another concave surface facing the image side.

In yet another exemplary embodiment, the refractive power of the first lens and the refractive power of the second lens are opposite in sign.

In another exemplary embodiment, the first lens includes a convex surface facing the object side and a concave surface facing the image side, the second lens is a meniscus lens and includes a convex surface facing the object side and a concave surface facing the image side, the third lens is a biconcave lens and further includes another concave surface facing the image side, and the fourth lens includes a convex surface facing the image side.

In yet another exemplary embodiment, the lens assembly further includes a stop disposed between the fourth lens and the sixth lens.

In another exemplary embodiment, the lens assembly satisfies: $3.0 \leq TTL/f \leq 3.8$; wherein f is an effective focal length of the lens assembly and TTL is an interval from an object side surface of the first lens to an image plane along the optical axis.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

The present invention provides a lens assembly including a first lens, a second lens, a third lens, a fourth lens, a fifth lens, a sixth lens, a seventh lens, an eighth lens, and a ninth lens. The first lens is with refractive power. The second lens is with refractive power. The third lens is with negative refractive power and includes a concave surface facing an object side. The fourth lens is with positive refractive power. The fifth lens is with positive refractive power and includes a convex surface facing the object side. The sixth lens is with positive refractive power and includes a convex surface facing an image side. The seventh lens is with refractive power. The eighth lens is with refractive power. The ninth lens is with positive refractive power and includes a convex surface facing the object side. The first lens, the second lens, the third lens, the fourth lens, the fifth lens, the sixth lens, the seventh lens, the eighth lens, and the ninth lens are arranged in order from the object side to the image side along an optical axis. An air gap is disposed between the sixth lens and the seventh lens.

Figure 1:
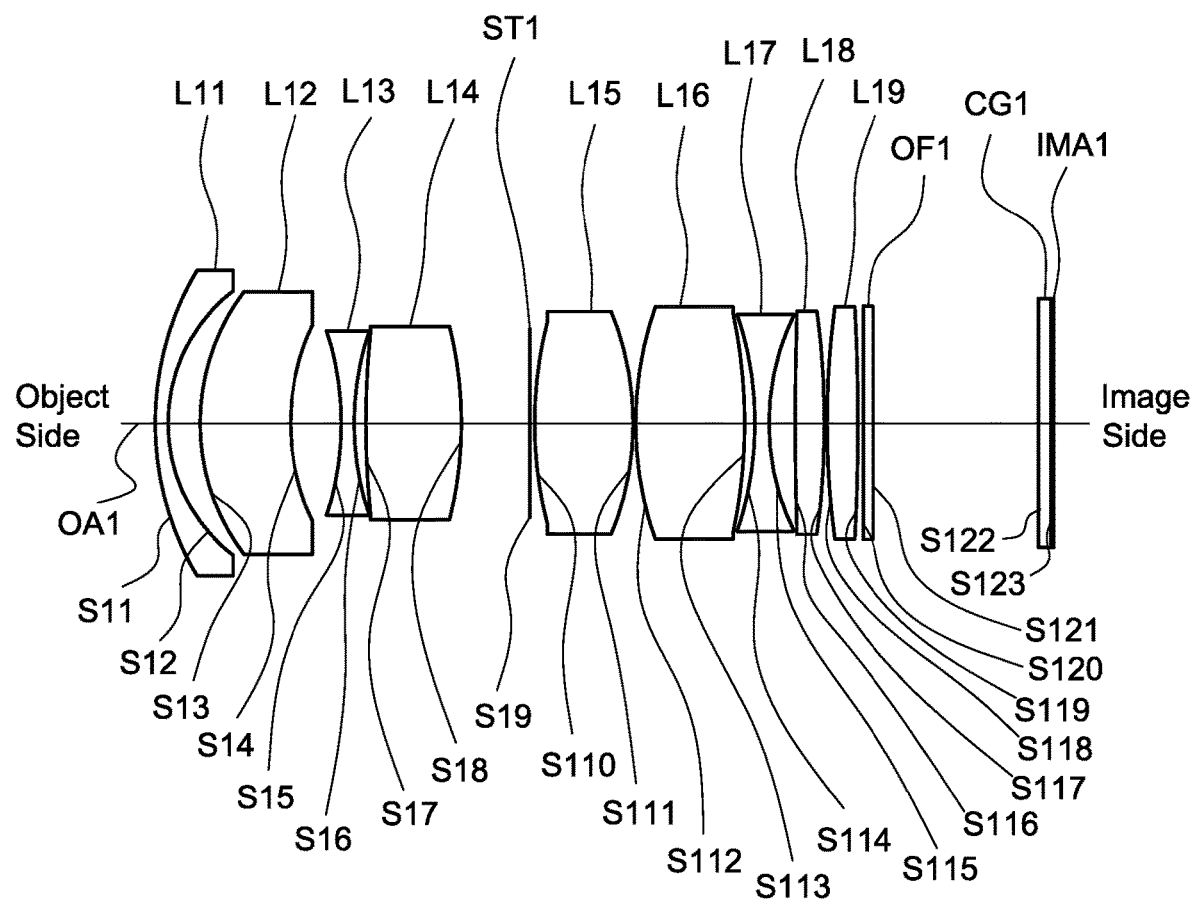
FIG. 1 is a lens layout diagram of a lens assembly in accordance with a first embodiment of the invention.
Figure 2A:
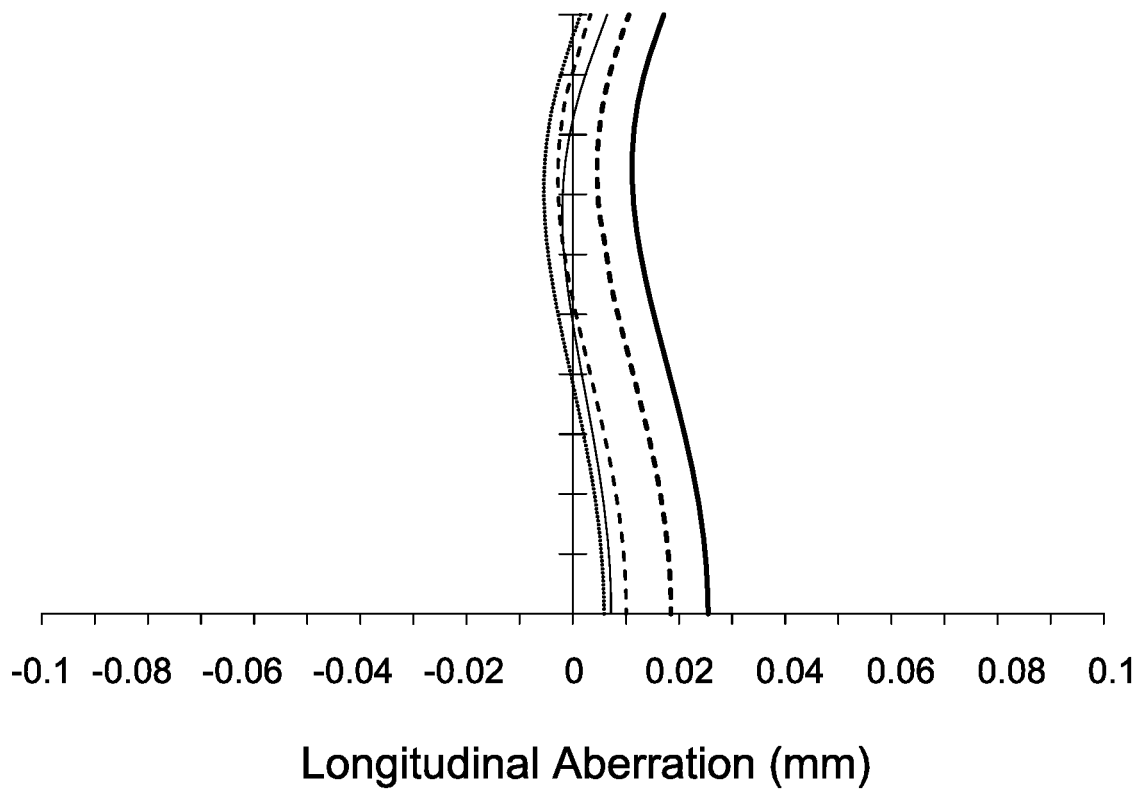
FIG. 2A, FIG. 2B, FIG. 2C, FIG. 2D, and FIG. 2E depict a longitudinal aberration diagram, a field curvature diagram, a distortion diagram, a lateral color diagram, and a modulation transfer function, respectively, of the lens assembly in accordance with the first embodiment of the invention, respectively.
Figure 2B:
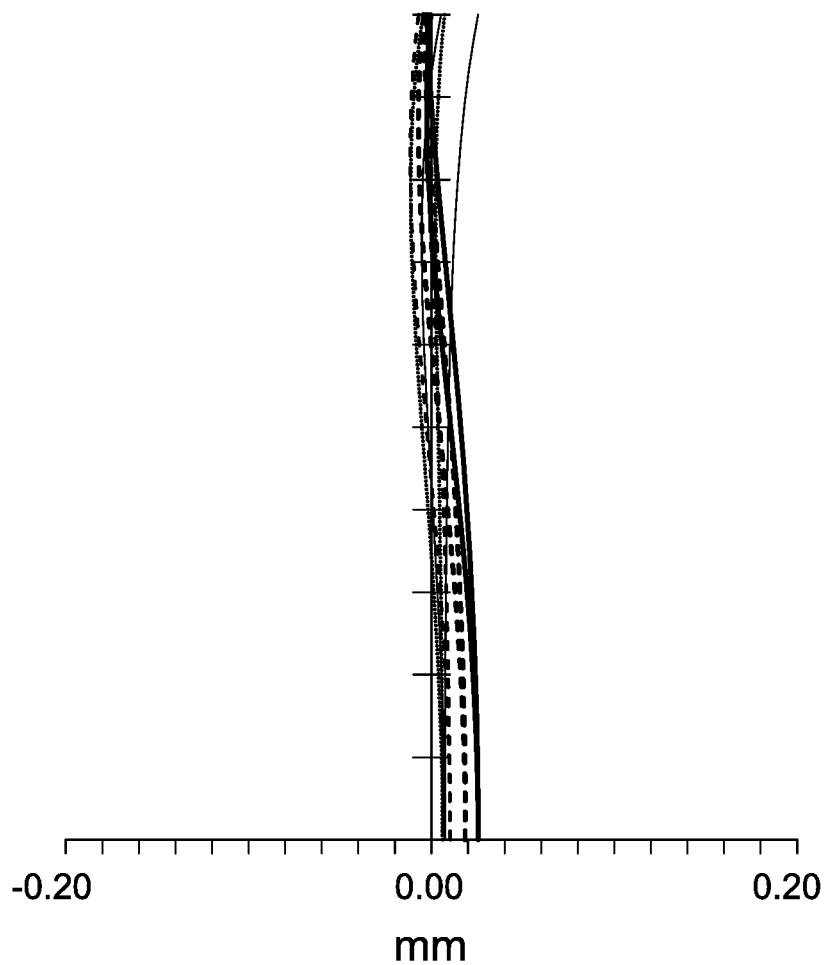
Figure 2C:
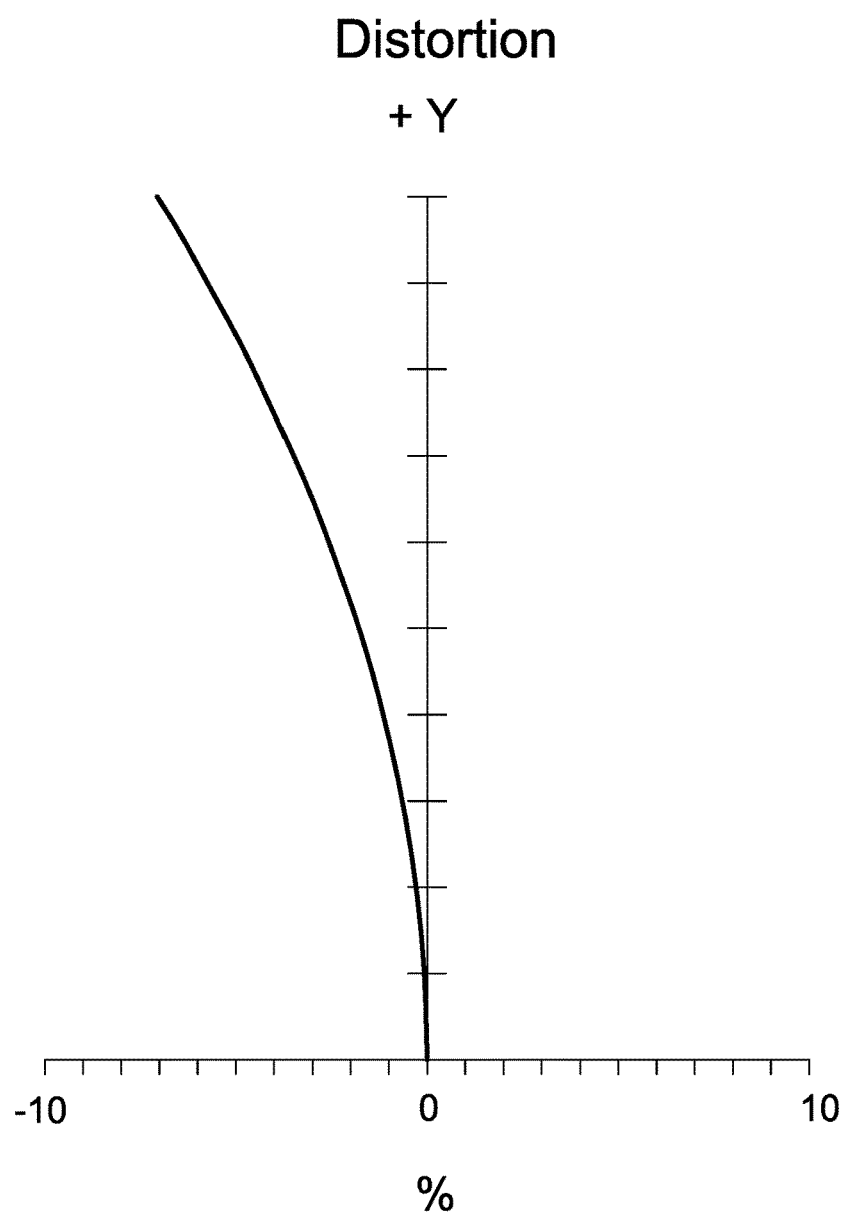
Figure 2D:
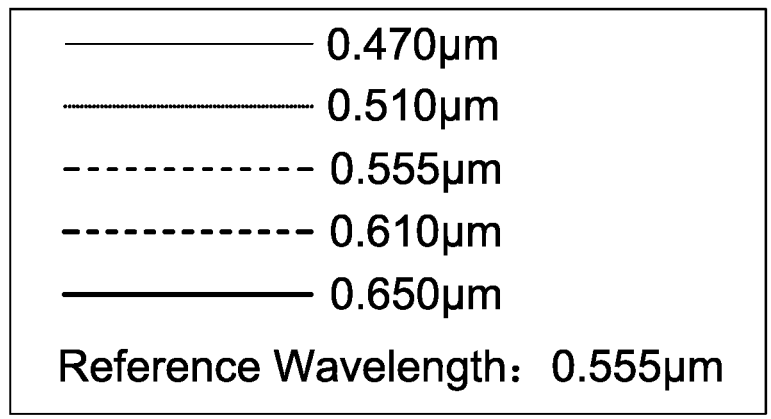
Figure 2D:
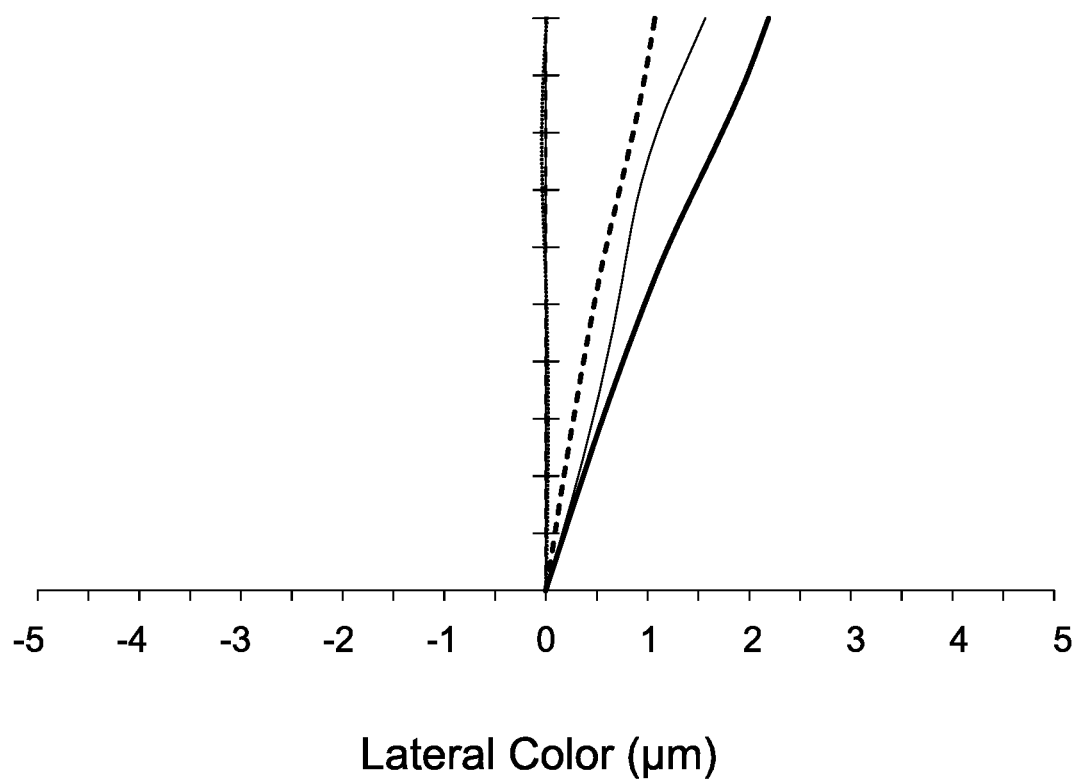
Figure 2E:
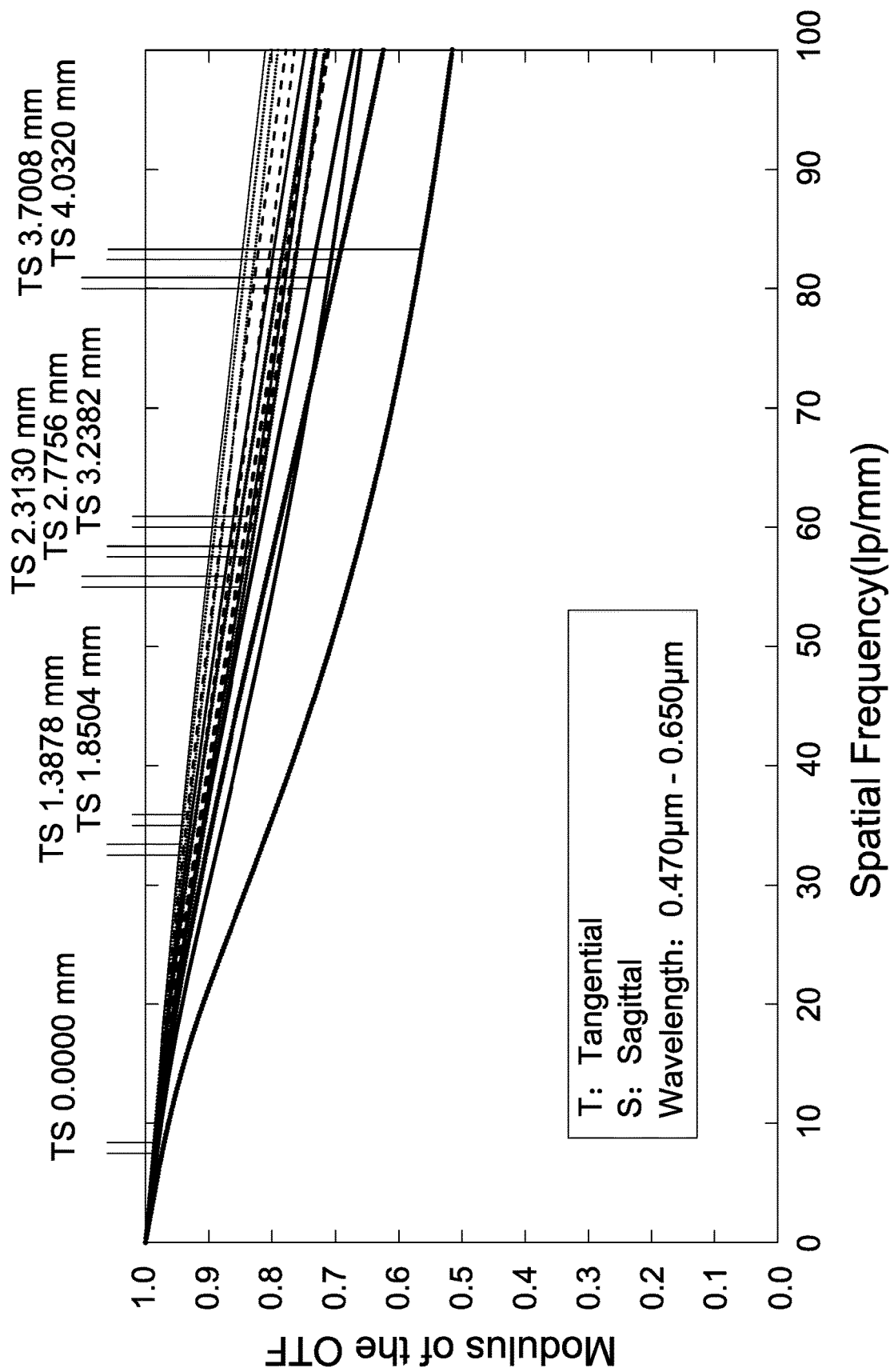
Figure 3:
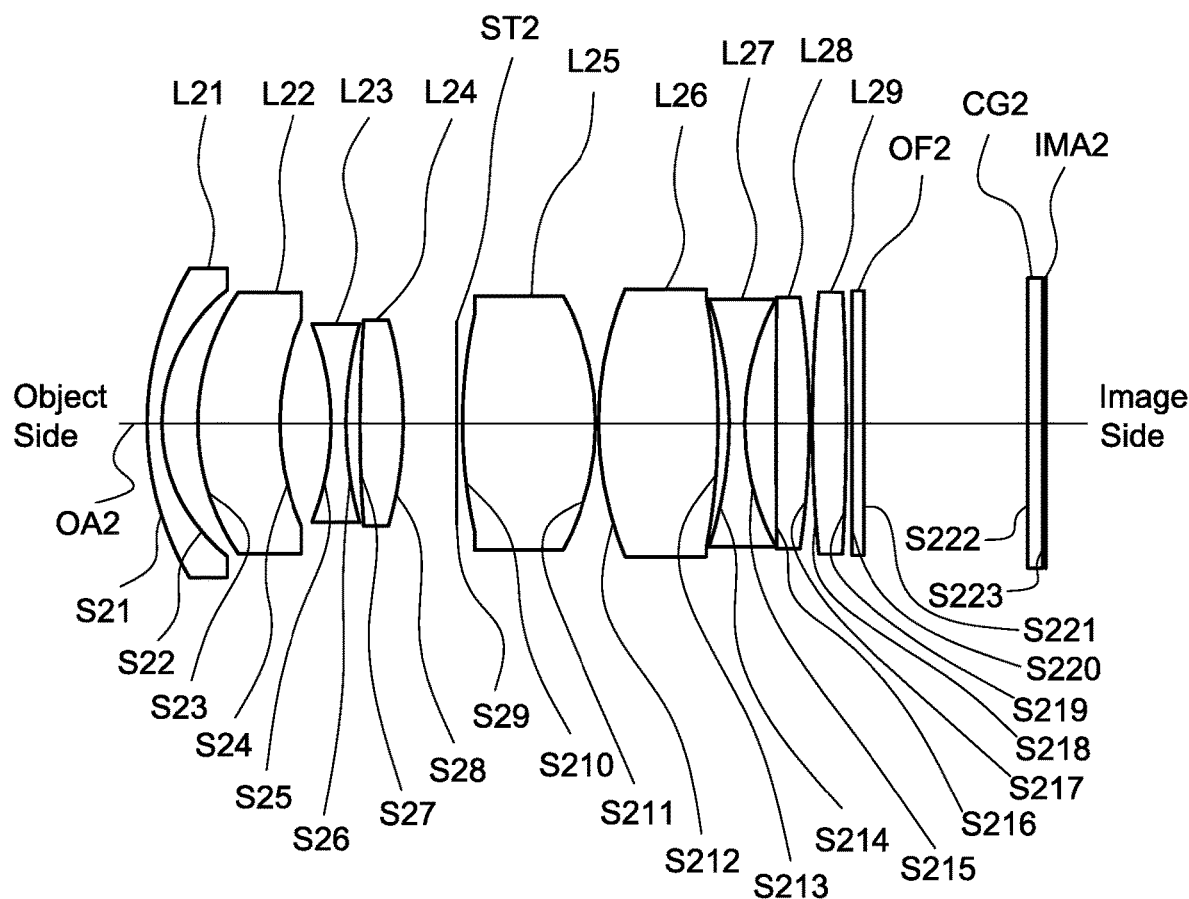
FIG. 3 is a lens layout diagram of a lens assembly in accordance with a second embodiment of the invention.
Figure 4A:
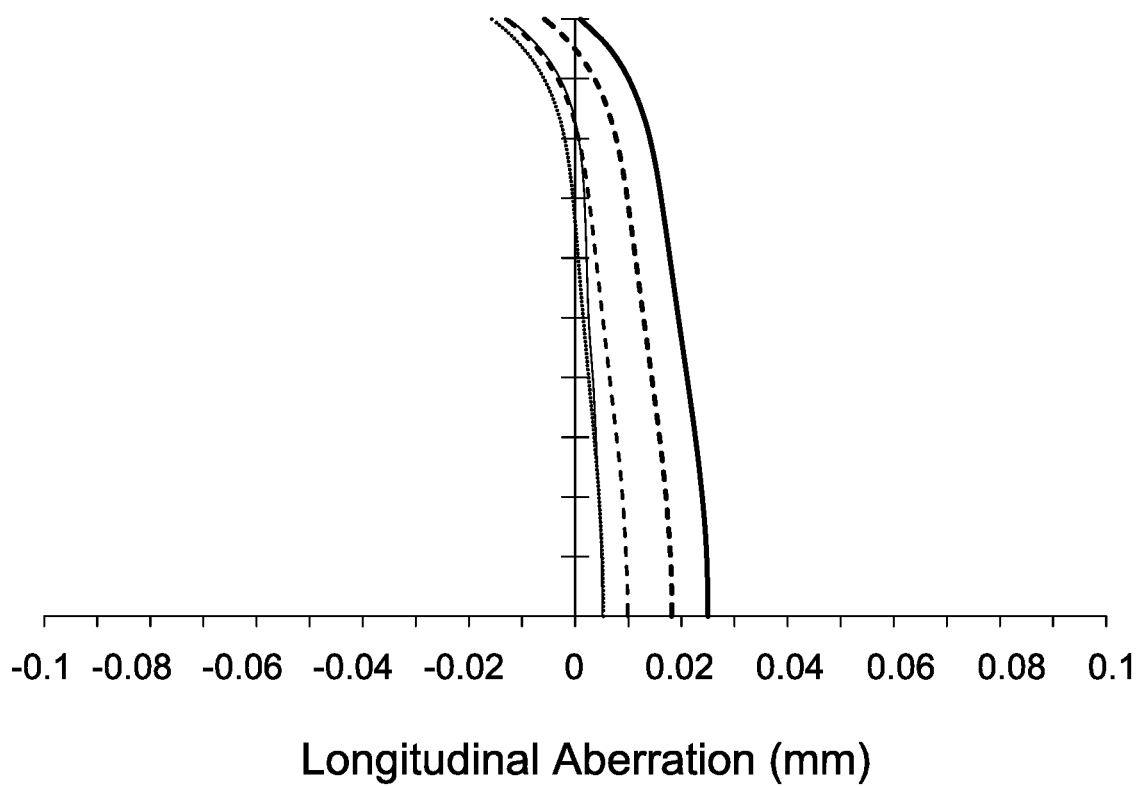
FIG. 4A, FIG. 4B, FIG. 4C, FIG. 4D, and FIG. 4E depict a longitudinal aberration diagram, a field curvature diagram, a distortion diagram, a lateral color diagram, and a modulation transfer function, respectively, of the lens assembly in accordance with the second embodiment of the invention, respectively.
Figure 4B:
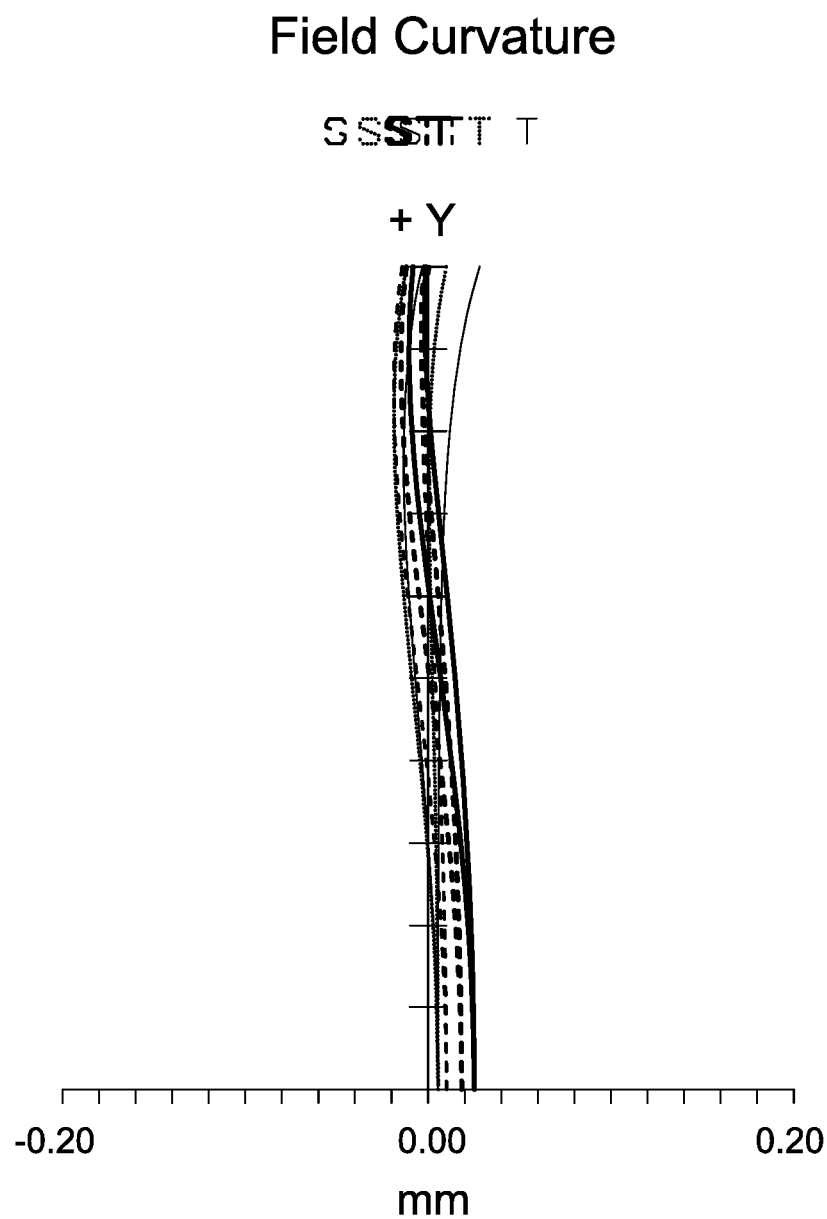
Figure 4C:
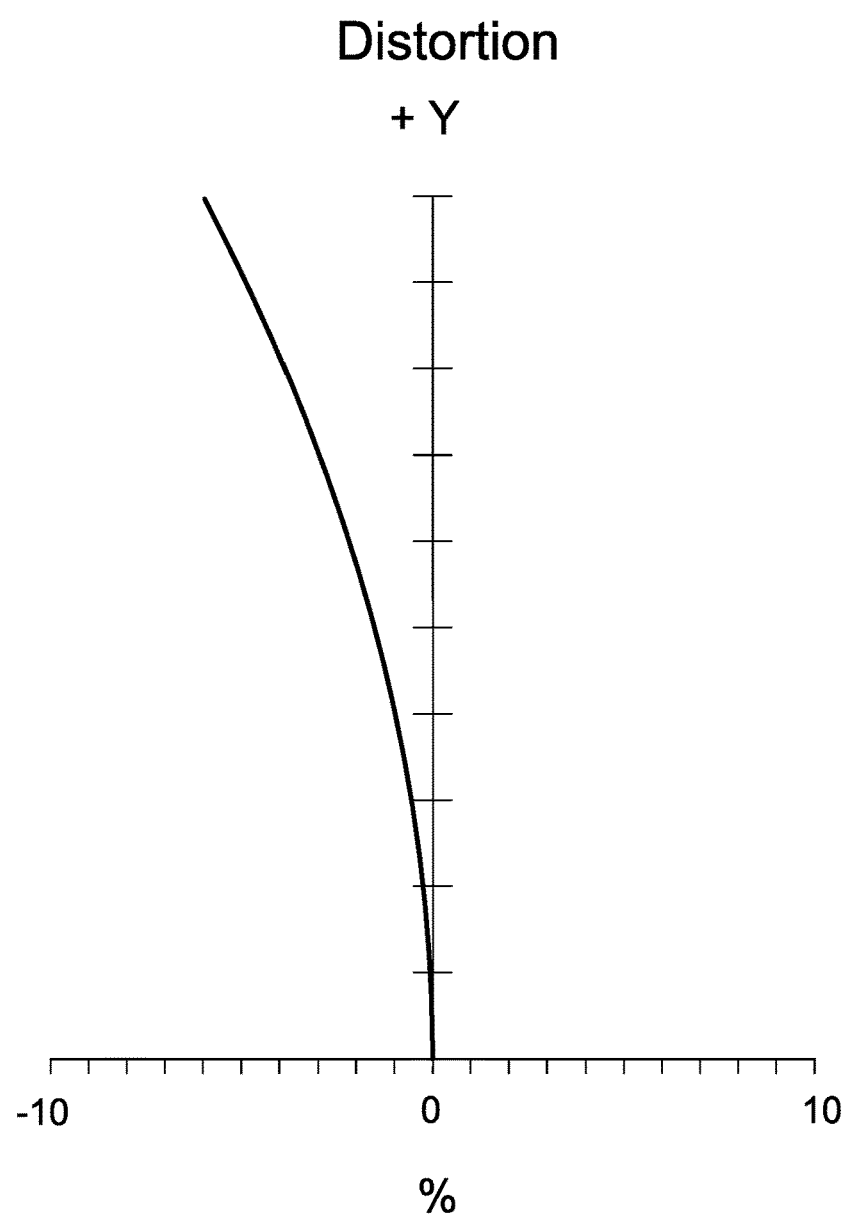
Figure 4D:
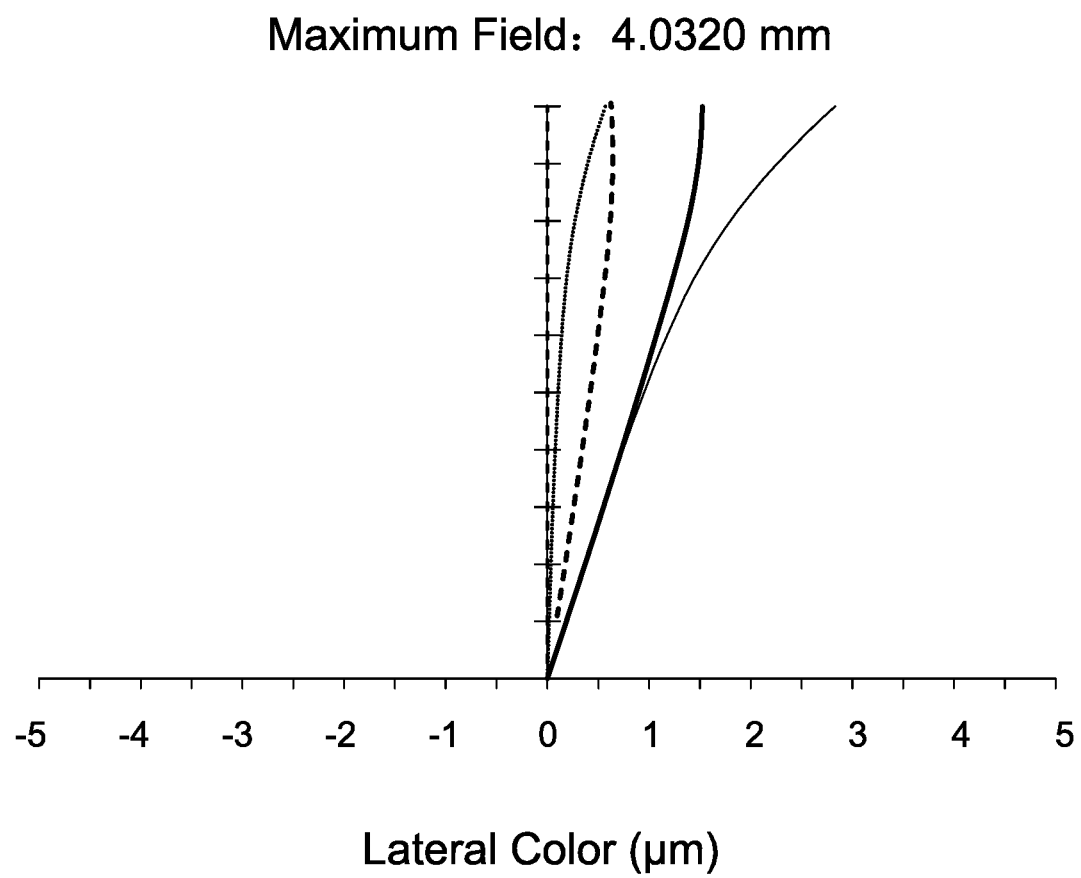
Figure 4E:
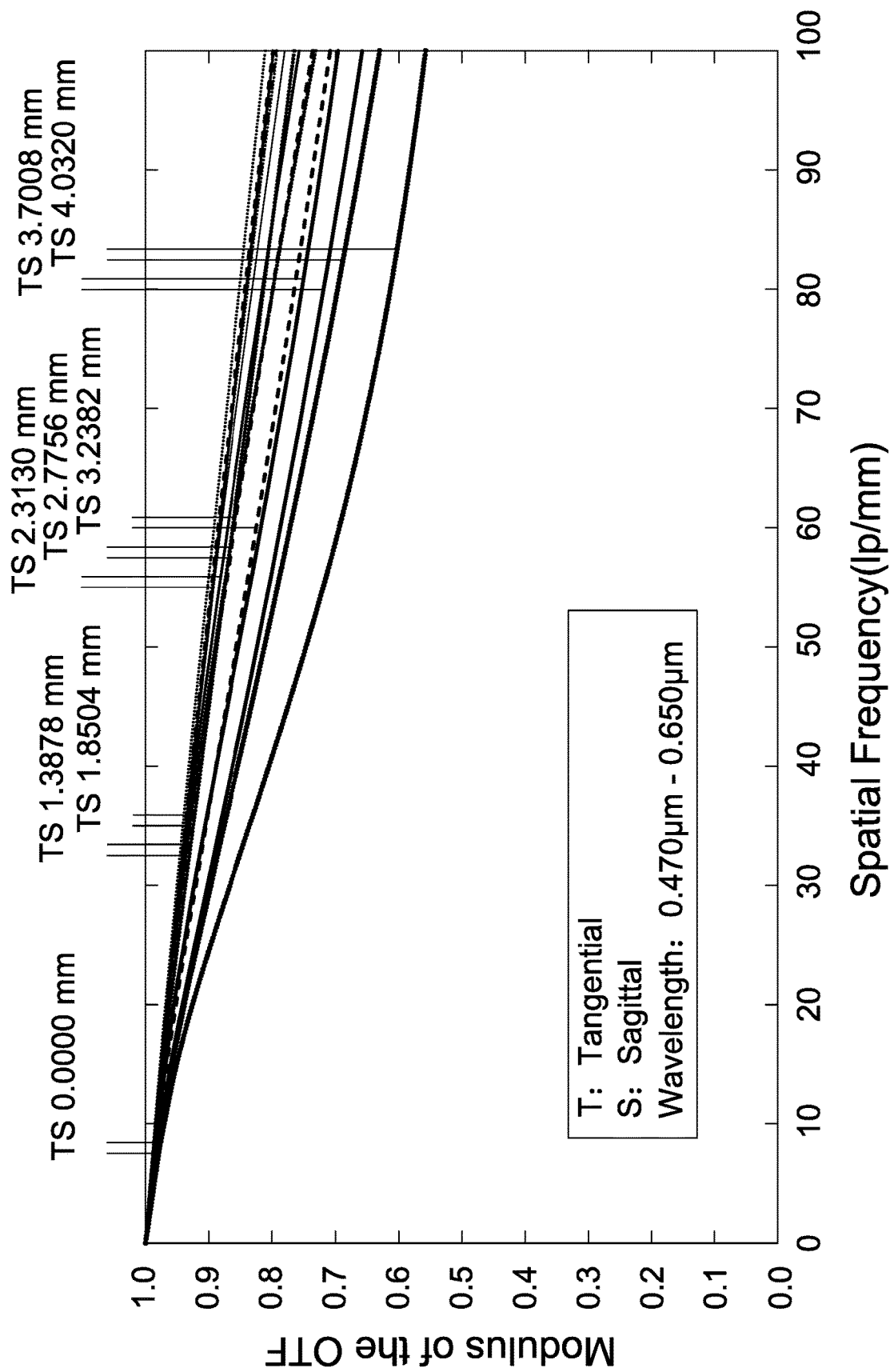
Figure 5:
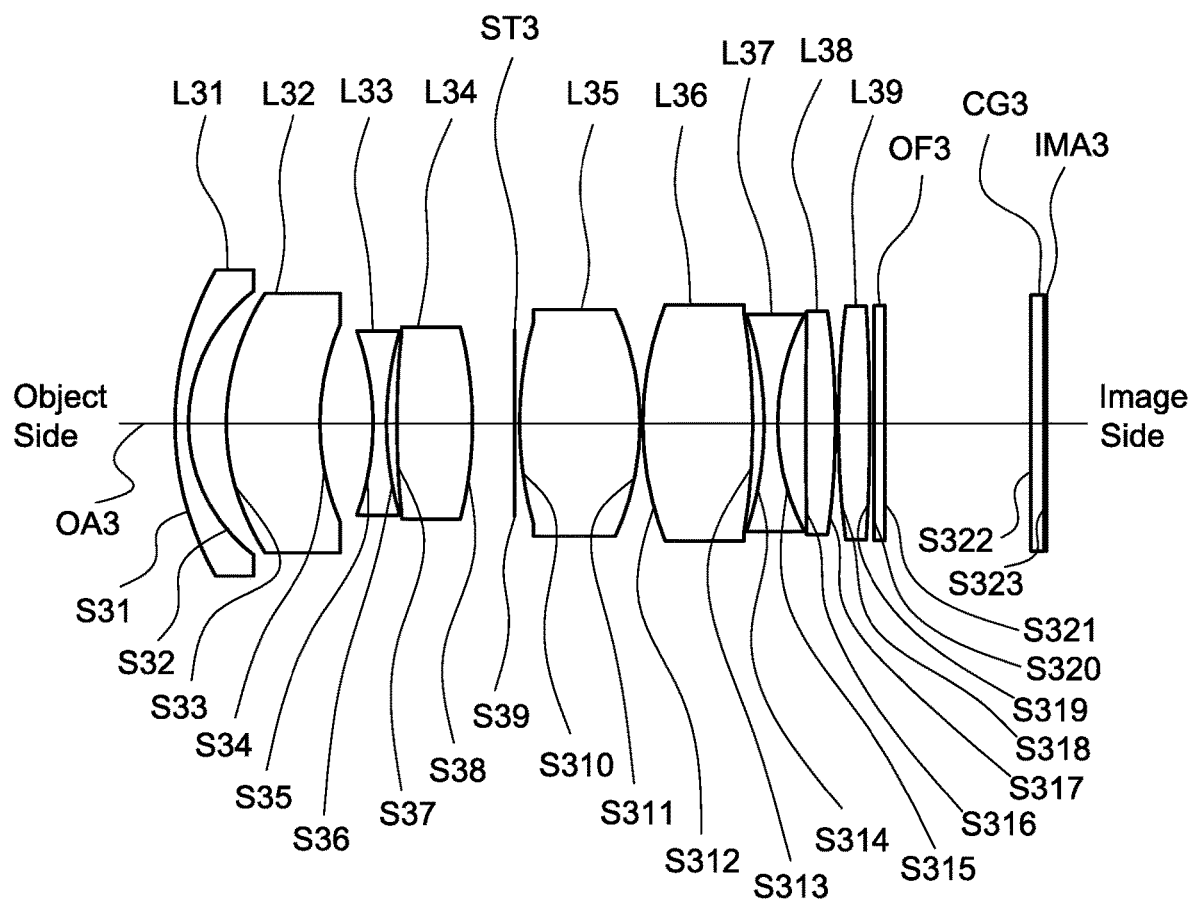
FIG. 5 is a lens layout diagram of a lens assembly in accordance with a third embodiment of the invention.
Figure 6A:
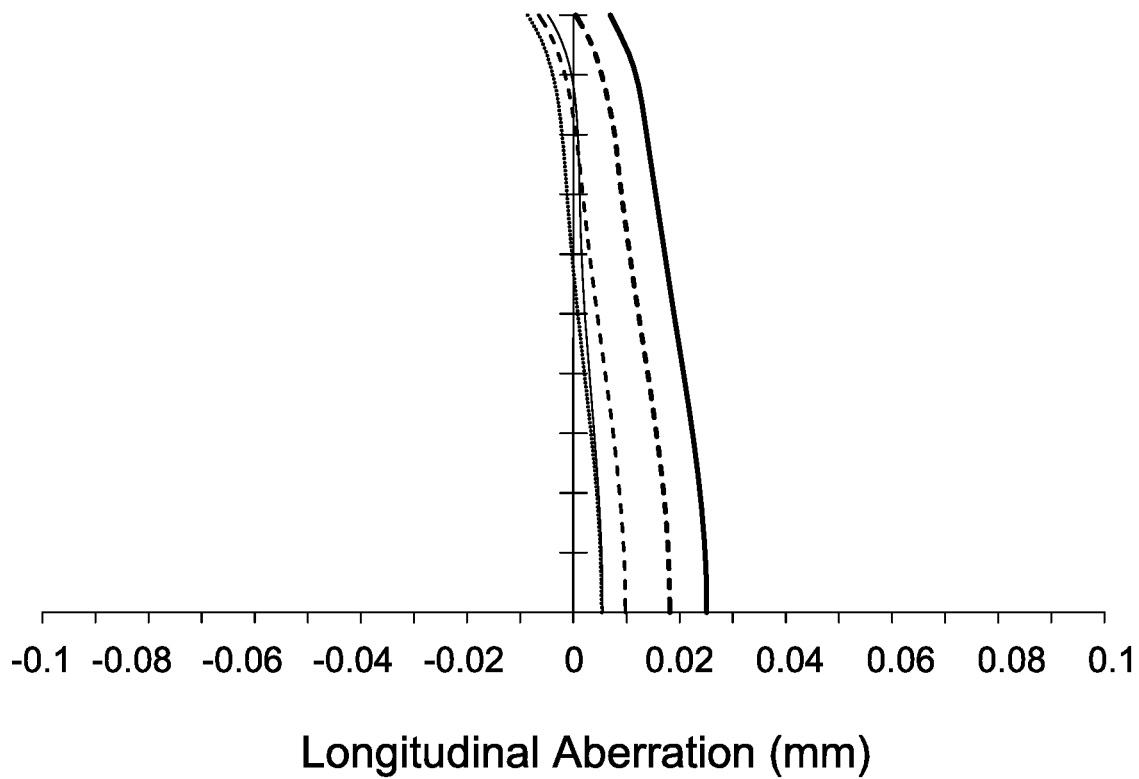
FIG. 6A, FIG. 6B, FIG. 6C, FIG. 6D, and FIG. 6E depict a longitudinal aberration diagram, a field curvature diagram, a distortion diagram, a lateral color diagram, and a modulation transfer function, respectively, of the lens assembly in accordance with the third embodiment of the invention, respectively.
Figure 6B:
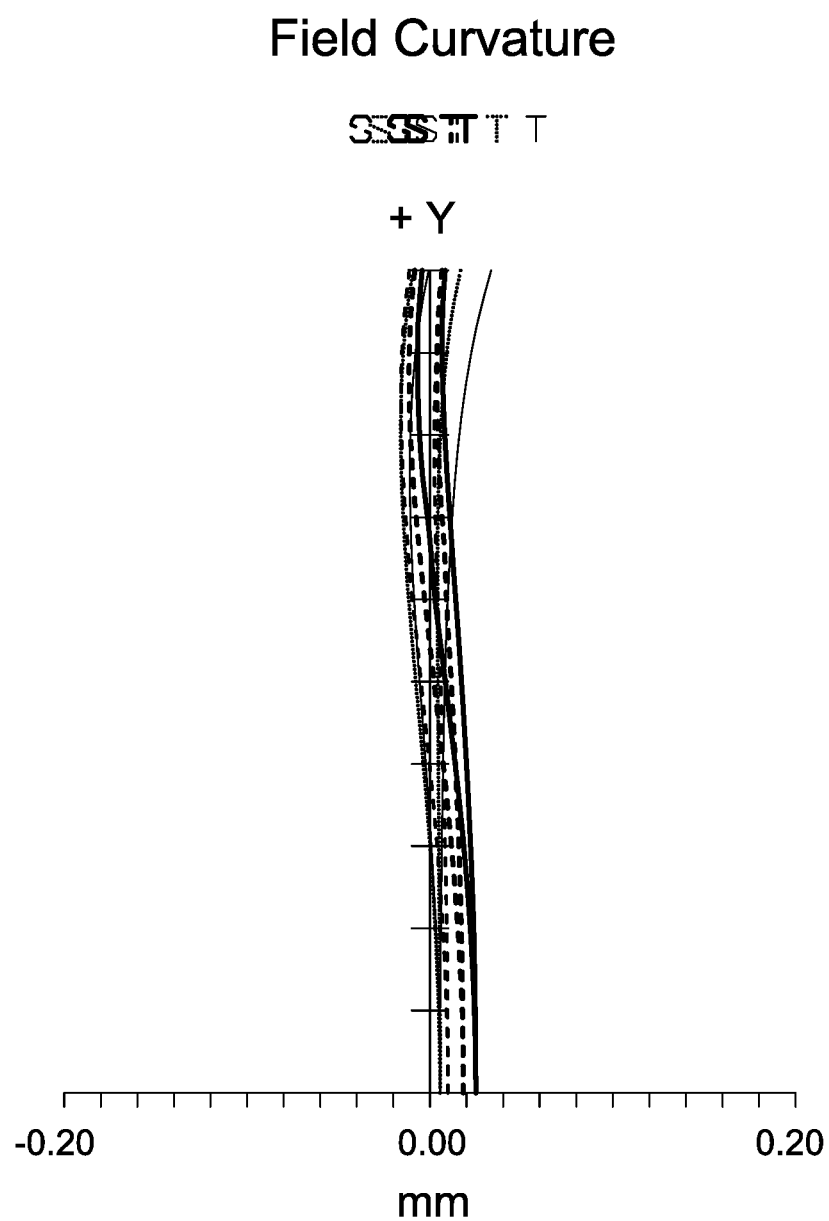
Figure 6C:
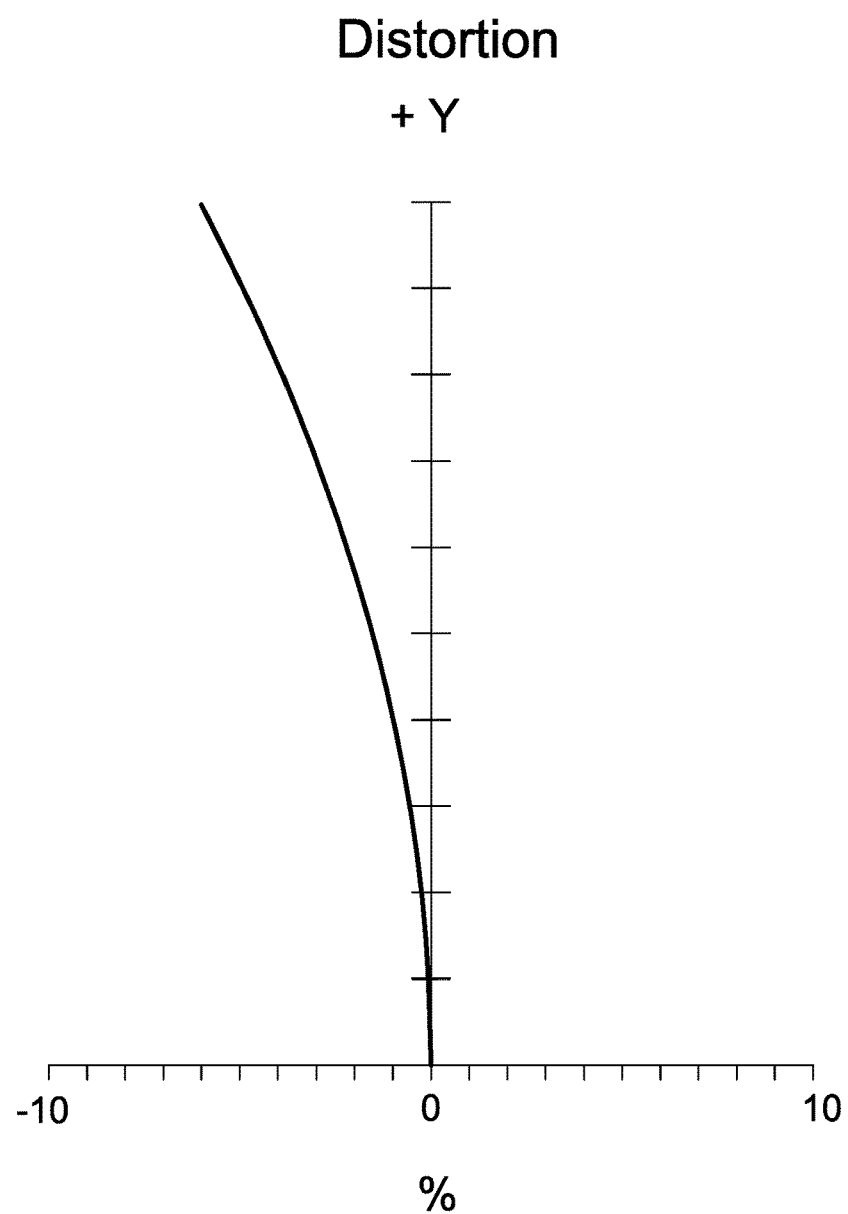
Figure 6D:
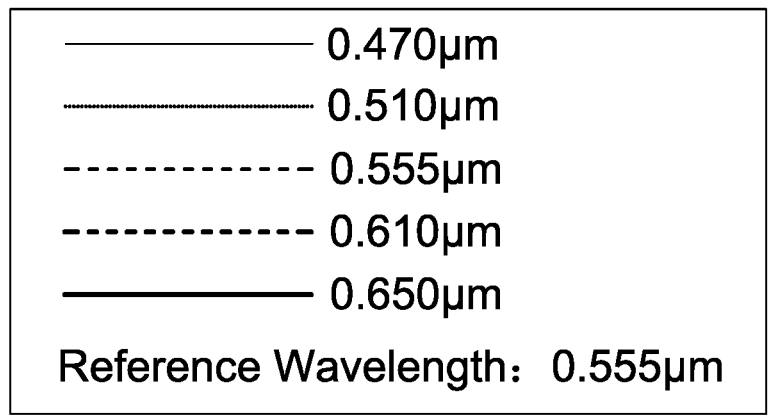
Figure 6D:
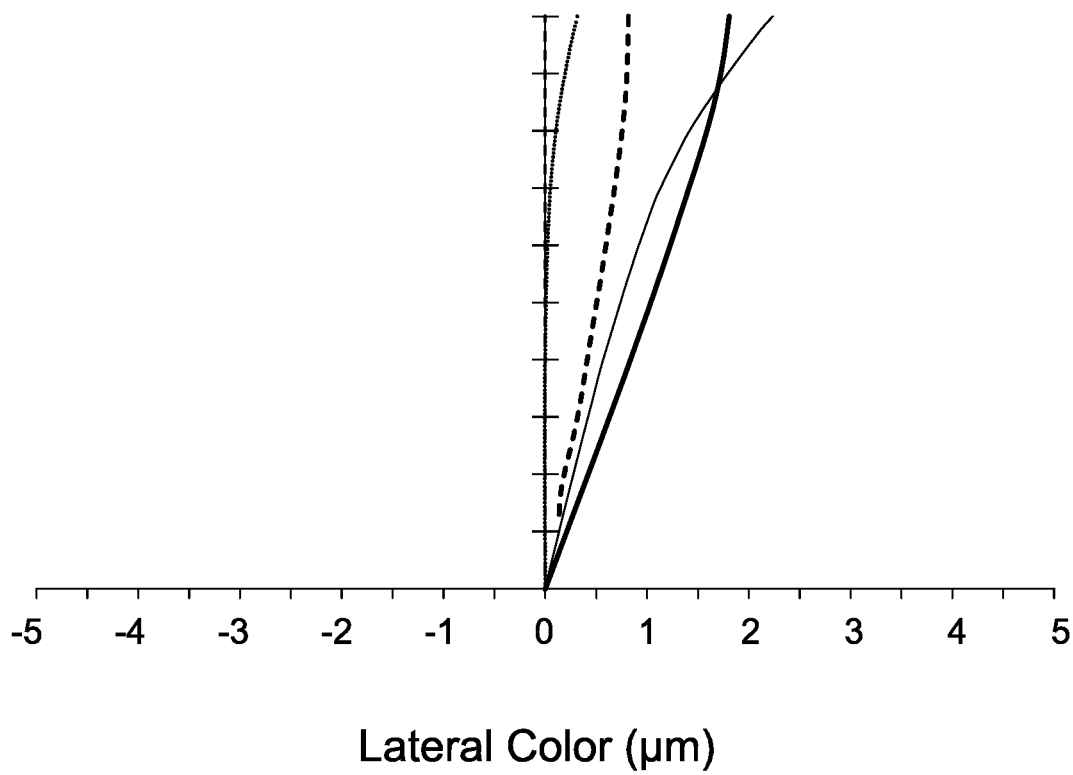
Figure 6E:
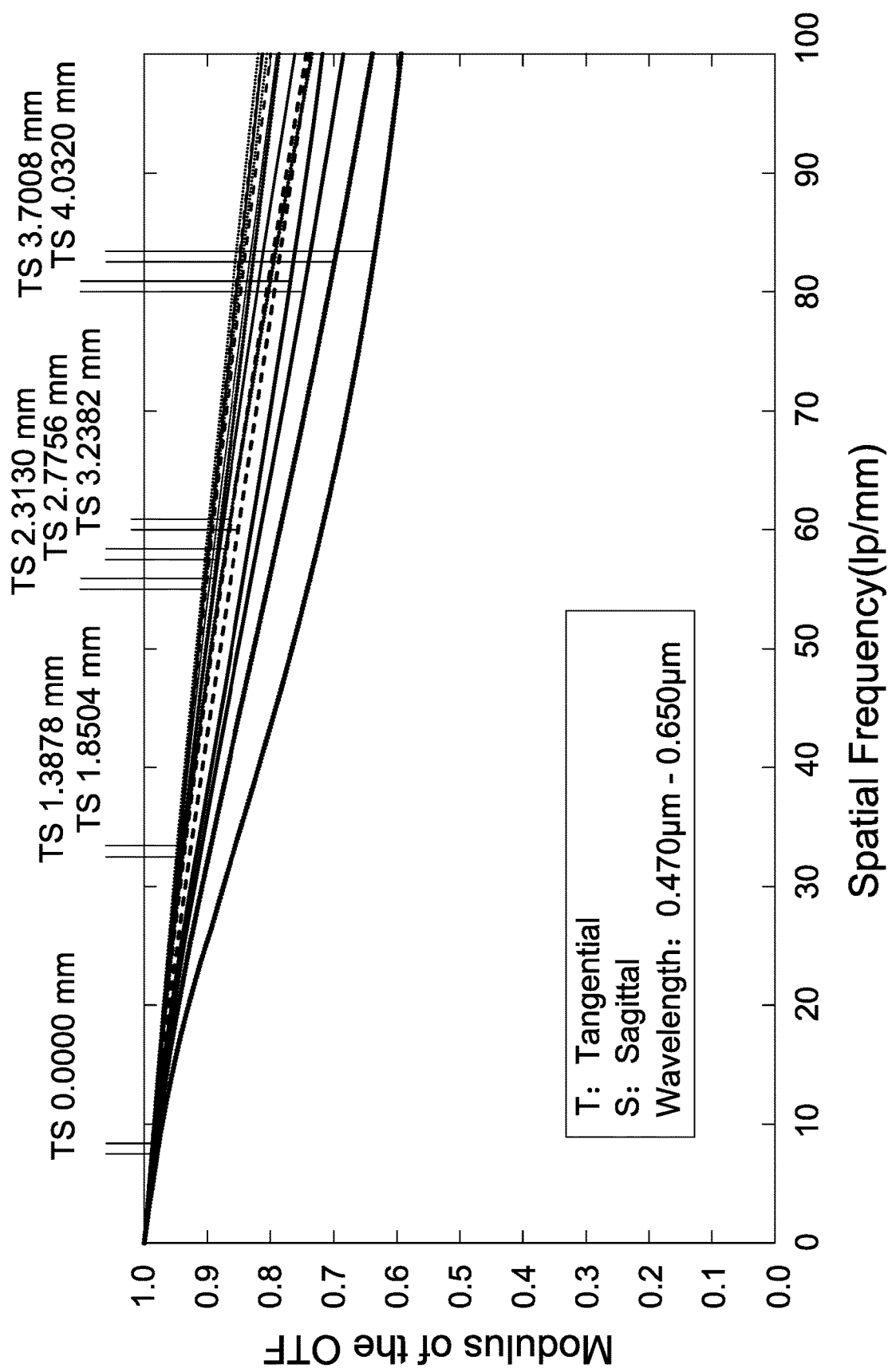

Referring to Table 1, Table 3, and Table 5, wherein Table 1, Table 3, and Table 5 show optical specification in accordance with a first, second, and third embodiments of the invention, respectively. FIG. 1, FIG. 3, and FIG. 5 are lens layout diagrams of the lens assemblies in accordance with the first, second, and third embodiments of the invention, respectively.

The first lenses L11, L21, L31 are meniscus lenses with negative refractive power and made of glass material, wherein the object side surfaces S11, S21, S31 are convex surfaces, the image side surfaces S12, S22, S32 are concave surfaces, and both of the object side surfaces S11, S21, S31 and image side surfaces S12, S22, S32 are spherical surfaces.

The second lenses L12, L22, L32 are meniscus lenses with positive refractive power and made of glass material, wherein the object side surfaces S13, S23, S33 are convex surfaces, the image side surfaces S14, S24, S34 are concave surfaces, and both of the object side surfaces S13, S23, S33 and image side surfaces S14, S24, S34 are spherical surfaces.

The third lenses L13, L23, L33 are biconcave lenses with negative refractive power and made of glass material, wherein the object side surfaces S15, S25, S35 are concave surfaces, the image side surfaces S16, S26, S36 are concave surfaces, and both of the object side surfaces S15, S25, S35 and image side surfaces S16, S26, S36 are spherical surfaces.

The fourth lenses L14, L24, L34 are biconvex lenses with positive refractive power and made of glass material, wherein the object side surfaces S17, S27, S37 are convex surfaces, the image side surfaces S18, S28, S38 are convex surfaces, and both of the object side surfaces S17, S27, S37 and image side surfaces S18, S28, S38 are spherical surfaces.

The fifth lenses L15, L25, L35 are biconvex lenses with positive refractive power and made of glass material, wherein the object side surfaces S110, S210, S310 are convex surfaces, the image side surfaces S11, S211, S311 are convex surfaces, and both of the object side surfaces S110, S210, S310 and image side surfaces S111, S211, S311 are spherical surfaces.

The sixth lenses L16, L26, L36 are biconvex lenses with positive refractive power and made of glass material, wherein the object side surfaces S112, S212, S312 are convex surfaces, the image side surfaces S113, S213, S313 are convex surfaces, and both of the object side surfaces S112, S212, S312 and image side surfaces S113, S213, S313 are spherical surfaces.

The seventh lenses L17, L27, L37 are biconcave lenses with negative refractive power and made of glass material, wherein the object side surfaces S114, S214, S314 are concave surfaces, the image side surfaces S115, S215, S315 are concave surfaces, and both of the object side surfaces S114, S214, S314 and image side surfaces S115, S215, S315 are spherical surfaces.

The eighth lenses L18, L28, L38 are biconvex lenses with positive refractive power and made of glass material, wherein the object side surfaces S116, S216, S316 are convex surfaces, the image side surfaces S117, S217, S317 are convex surfaces, and both of the object side surfaces S116, S216, S316 and image side surfaces S117, S217, S317 are spherical surfaces.

The ninth lenses L19, L29, L39 are biconvex lenses with positive refractive power and made of glass material, wherein the object side surfaces S118, S218, S318 are convex surfaces, the image side surfaces S119, S219, S319 are convex surfaces, and both of the object side surfaces S118, S218, S318 and image side surfaces S119, S219, S319 are spherical surfaces.

In addition, the lens assemblies 1, 2, 3 satisfy at least one of the following conditions:

$$3.0 \leq TTL/f \leq 3.8; \quad (1)$$

$$0.65 \leq f/f_5 \leq 0.8; \quad (2)$$

$$2.7 \leq TTL/R_{11} \leq 3.0; \quad (3)$$

$$1.15 \leq f_4/f_{67} \leq 1.80; \quad (4)$$

$$Vd2 < 30; \quad (5)$$

$$Vd4 > 35; \quad (6)$$

$$-4.3 < (R_{41} - R_{82})/f_4 < 25; \quad (7)$$

$$-5.2 < (R_{k2} - R_{m2})/f_e < 37.6; \quad (8)$$

$$10 \text{ mm} < f_4 - R_{k2} < 56.5 \text{ mm}; \quad (9)$$

$$-22 < (R_{m2} + f_1)/f_k < -1; \quad (10)$$

wherein TTL is respectively an interval from the object side surfaces S11, S21, S31 of the first lenses L11, L21, L31 to the image planes IMA1, IMA2, IMA3 along the optical axes OA1, OA2, OA3 for the first to third embodiments, f is an effective focal length of the lens assemblies 1, 2, 3 for the first to third embodiments, $f_1$ is an effective focal length of the first lenses L11, L21 L31 for the first to third embodiments, $f_4$ is an effective focal length of the fourth lenses L14, L24 L34 for the first to third embodiments, $f_5$ is an effective focal length of the fifth lenses L15, L25, L35 for the first to third embodiments, $f_k$ is an effective focal length of the lenses L18, L28, L38 second close to the image side for the first to third embodiments, $f_e$ is an effective focal length of the lenses L15, L25, L35 fifth close to the image side for the first to third embodiments, $f_{34}$ is an effective focal length of a combination of the third lenses L13, L23, L33 and the fourth lenses L14, L24, L34 for the first to third embodiments, $f_{67}$ is an effective focal length of a combination of the sixth lenses L16, L26, L36 and the seventh lenses L17, L27, L37 for the first to third embodiments, $R_{11}$ is a radius of curvature of the object side surfaces S11, S21, S31 of the first lenses L11, L21, L31 for the first to third embodiments, $R_{41}$ is a radius of curvature of the object side surfaces S17, S27, S37 of the fourth lenses L14, L24, L34 for the first to third embodiments, $R_{82}$ is a radius of curvature of the image side surfaces S117, S217, S317 of the eighth lenses L18, L28, L38 for the first to third embodiments, $R_{k2}$ is a radius of curvature of the image side surfaces S117, S217, S317 of the lenses L18, L28, L38 second close to the image side for the first to third embodiments, $R_{m2}$ is a radius of curvature of the image side surfaces S119, S219, S319 of the lenses L19, L29, L39 closest to the image side for the first to third embodiments, Vd2 is an Abbe number of the second lenses L12, L22, L32 for the first to third embodiments, and Vd4 is an Abbe number of the fourth lenses L14, L24, L34 for the first to third embodiments. With the lens assemblies 1, 2, 3 satisfying at least one of the above conditions (1)-(10), the total lens length can be effectively shortened, the F-number can be effectively decreased, the resolution can be effectively increased, the aberration can be effectively corrected, and the chromatic aberration can be effectively corrected.

A detailed description of a lens assembly in accordance with a first embodiment of the invention is as follows. Referring to FIG. 1, the lens assembly 1 includes a first lens L11, a second lens L12, a third lens L13, a fourth lens L14, a stop ST1, a fifth lens L15, a sixth lens L16, a seventh lens L17, an eighth lens L18, a ninth lens L19, an optical filter OF1, and a cover glass CG1, all of which are arranged in order from an object side to an image side along an optical axis OA1. In operation, the light from the object side is imaged on an image plane IMA1. According to the foregoing, wherein: both of the object side surface S120 and image side surface S121 of the optical filter OF1 are plane surfaces; and both of the object side surface S122 and image side surface S123 of the cover glass CG1 are plane surfaces. With the above design of the lenses, stop ST1, and at least one of the conditions (1)-(10) satisfied, the lens assembly 1 can have an effective shortened total lens length, an effective decreased F-number, an effective increased resolution, an effective corrected aberration, and an effective corrected chromatic aberration.

Table 1 shows the optical specification of the lens assembly 1 in FIG. 1.

TABLE 1

Effective Focal Length = 9.70 mm F-number = 1.8
Total Lens Length = 35.012 mm Field of View = 48.206 degrees

| Surface Number | Radius of Curvature (mm) | Thickness (mm) | Nd | Vd | Effective Focal Length (mm) | Remark |
|---|---|---|---|---|---|---|
| S11 | 11.77 | 0.50 | 1.65 | 33.79 | −23.37 | L11 |
| S12 | 6.53 | 1.250 | | | | |
| S13 | 8.61 | 3.520 | 1.92 | 20.88 | 41.58 | L12 |
| S14 | 8.89 | 1.996 | | | | |
| S15 | −11.54 | 0.50 | 1.64 | 34.47 | −8.76 | L13 |
| S16 | 11.19 | 0.457 | | | | |
| S17 | 34.88 | 3.717 | 1.88 | 40.87 | 12.53 | L14 |
| S18 | −15.49 | 2.655 | | | | |
| S19 | ∞ | 0.190 | | | | ST1 |
| S110 | 16.08 | 3.857 | 1.50 | 81.61 | 13.99 | L15 |
| S111 | −11.32 | 0.090 | | | | |
| S112 | 13.98 | 4.233 | 1.73 | 54.68 | 12.05 | L16 |

TABLE 1-continued

Effective Focal Length = 9.70 mm F-number = 1.8
Total Lens Length = 35.012 mm Field of View = 48.206 degrees

| Surface Number | Radius of Curvature (mm) | Thickness (mm) | Nd | Vd | Effective Focal Length (mm) | Remark |
|---|---|---|---|---|---|---|
| S113 | −20.82 | 0.414 | | | | |
| S114 | −13.06 | 0.534 | 1.72 | 29.23 | −7.54 | L17 |
| S115 | 9.58 | 1.028 | | | | |
| S116 | 170.78 | 1.138 | 1.88 | 40.87 | 30.05 | L18 |
| S117 | −31.48 | 0.10 | | | | |
| S118 | 34.82 | 1.203 | 1.77 | 49.60 | 31.48 | L19 |
| S119 | −80.35 | 0.20 | | | | |
| S120 | ∞ | 0.40 | 1.52 | 64.17 | | OF1 |
| S121 | ∞ | 6.430 | | | | |
| S122 | ∞ | 0.50 | 1.52 | 64.17 | | CG1 |
| S123 | ∞ | 0.10 | | | | |

Table 2 shows the parameters and condition values for conditions (1)-(10) in accordance with the first embodiment of the invention. It can be seen from Table 2 that the lens assembly 1 of the first embodiment satisfies the conditions (1)-(10).

TABLE 2

| | | | | | |
|---|---|---|---|---|---|
| $f_k$ | 30.05 mm | $f_e$ | 13.99 mm | $f_{34}$ | −62.71 mm |
| $f_{67}$ | −38.15 mm | $R_{k2}$ | −31.48 mm | $R_{m2}$ | −80.35 mm |
| TTL/f | 3.61 | $f/f_5$ | 0.69 | TTL/$R_{11}$ | 2.97 |
| $f_{34}/f_{67}$ | 1.64 | Vd2 | 20.88 | Vd4 | 40.87 |
| $(R_{41} − R_{82})/f_4$ | 5.30 | $(R_{k2} − R_{m2})/f_e$ | 3.49 | $f_4 − R_{k2}$ | 44.01 mm |
| $(R_{m2} + f_1)/f_k$ | −3.45 | | | | |

In addition, the lens assembly 1 of the first embodiment can meet the requirements of optical performance as seen in FIGS. 2A-2E. It can be seen from FIG. 2A that the longitudinal aberration in the lens assembly 1 of the first embodiment ranges from −0.01 mm to 0.03 mm. It can be seen from FIG. 2B that the field curvature of tangential direction and sagittal direction in the lens assembly 1 of the first embodiment ranges from −0.02 mm to 0.03 mm. It can be seen from FIG. 2C that the distortion in the lens assembly 1 of the first embodiment ranges from −8% to 0%. It can be seen from FIG. 2D that the lateral color in the lens assembly 1 of the first embodiment ranges from −0.5 μm to 2.5 μm. It can be seen from FIG. 2E that the modulation transfer function of tangential direction and sagittal direction in the lens assembly 1 of the first embodiment ranges from 0.52 to 1.0. It is obvious that the longitudinal aberration, the field curvature, the distortion, and the lateral color of the lens assembly 1 of the first embodiment can be corrected effectively, and the image resolution of the lens assembly 1 of the first embodiment can meet the requirements. Therefore, the lens assembly 1 of the first embodiment is capable of good optical performance.

Referring to FIG. 3, the lens assembly 2 includes a first lens L21, a second lens L22, a third lens L23, a fourth lens L24, a stop ST2, a fifth lens L25, a sixth lens L26, a seventh lens L27, an eighth lens L28, a ninth lens L29, an optical filter OF2, and a cover glass CG2, all of which are arranged in order from an object side to an image side along an optical axis OA2. In operation, the light from the object side is imaged on an image plane IMA2. According to the foregoing, wherein: both of the object side surface S220 and image side surface S221 of the optical filter OF2 are plane surfaces; and both of the object side surface S222 and image side surface S223 of the cover glass CG2 are plane surfaces. With the above design of the lenses, stop ST2, and at least one of the conditions (1)-(10) satisfied, the lens assembly 2 can have an effective shortened total lens length, an effective decreased F-number, an effective increased resolution, an effective corrected aberration, and an effective corrected chromatic aberration.

Table 3 shows the optical specification of the lens assembly 2 in FIG. 3.

TABLE 3

Effective Focal Length = 9.70 mm F-number = 1.8
Total Lens Length = 30.005 mm Field of View = 47.716 degrees

| Surface dumber | Radius of Curvature (mm) | Thickness (mm) | Nd | Vd | Effective Focal Length (mm) | Remark |
|---|---|---|---|---|---|---|
| S21 | 10.17 | 0.50 | 1.65 | 33.79 | −20.37 | L21 |
| S22 | 5.65 | 1.180 | | | | |
| S23 | 7.77 | 2.746 | 1.92 | 20.88 | 33.75 | L22 |
| S24 | 8.57 | 1.720 | | | | |
| S25 | −8.97 | 0.50 | 1.64 | 34.47 | −7.95 | L23 |
| S26 | 12.14 | 0.480 | | | | |
| S27 | 50.16 | 1.440 | 1.88 | 40.87 | 11.01 | L24 |
| S28 | −11.96 | 1.770 | | | | |
| S29 | ∞ | 0.193 | | | | ST2 |
| S210 | 16.58 | 4.460 | 1.50 | 81.61 | 12.16 | L25 |
| S211 | −8.69 | 0.090 | | | | |
| S212 | 11.72 | 3.985 | 1.73 | 54.68 | 11.07 | L26 |
| S213 | −22.47 | 0.378 | | | | |
| S214 | −12.83 | 0.50 | 1.72 | 29.23 | −7.05 | L27 |
| S215 | 8.65 | 1.049 | | | | |
| S216 | 346.76 | 1.112 | 1.88 | 40.87 | 30.36 | L28 |
| S217 | −29.15 | 0.098 | | | | |
| S218 | 41.95 | 1.128 | 1.77 | 49.60 | 35.65 | L29 |
| S219 | −80.08 | 0.20 | | | | |
| S220 | ∞ | 0.40 | 1.52 | 64.17 | | OF2 |
| S221 | ∞ | 5.476 | | | | |
| S222 | ∞ | 0.50 | 1.52 | 64.17 | | CG2 |
| S223 | ∞ | 0.10 | | | | |

Table 4 shows the parameters and condition values for conditions (1)-(10) in accordance with the second embodiment of the invention. It can be seen from Table 4 that the lens assembly 2 of the second embodiment satisfies the conditions (1)-10).

TABLE 4

| | | | | | |
|---|---|---|---|---|---|
| $f_k$ | 30.36 mm | $f_e$ | 12.16 mm | $f_{34}$ | −48.93 mm |
| $f_{67}$ | −41.38 mm | $R_{k2}$ | −29.15 mm | $R_{m2}$ | −80.08 mm |
| TTL/f | 3.09 | $f/f_5$ | 0.80 | TTL/$R_{11}$ | 2.95 |
| $f_{34}/f_{67}$ | 1.18 | Vd2 | 20.88 | Vd4 | 40.87 |
| $(R_{41} − R_{82})/f_4$ | 7.20 | $(R_{k2} − R_{m2})/f_e$ | 4.19 | $f_4 − R_{k2}$ | 40.16 mm |
| $(R_{m2} + f_1)/f_k$ | −3.31 | | | | |

In addition, the lens assembly 2 of the second embodiment can meet the requirements of optical performance as seen in FIGS. 4A-4E. It can be seen from FIG. 4A that the longitudinal aberration in the lens assembly 2 of the second embodiment ranges from −0.02 mm to 0.03 mm. It can be seen from FIG. 4B that the field curvature of tangential direction and sagittal direction in the lens assembly 2 of the second embodiment ranges from −0.02 mm to 0.03 mm. It can be seen from FIG. 4C that the distortion in the lens assembly 2 of the second embodiment ranges from −6% to 0%. It can be seen from FIG. 4D that the lateral color in the lens assembly 2 of the second embodiment ranges from 0 μm to 3.0 μm. It can be seen from FIG. 4E that the modulation transfer function of tangential direction and sagittal direction in the lens assembly 2 of the second embodiment ranges from 0.56 to 1.0. It is obvious that the longitudinal aberration, the field curvature, the distortion, and the lateral color of the lens assembly 2 of the second embodiment can be corrected effectively, and the image resolution of the lens assembly 2 of the second embodiment can meet the requirements. Therefore, the lens assembly 2 of the second embodiment is capable of good optical performance.

Referring to FIG. 5, the lens assembly 3 includes a first lens L31, a second lens L32, a third lens L33, a fourth lens L34, a stop ST3, a fifth lens L35, a sixth lens L36, a seventh lens L37, an eighth lens L38, a ninth lens L39, an optical filter OF3, and a cover glass CG3, all of which are arranged in order from an object side to an image side along an optical axis OA3. In operation, the light from the object side is imaged on an image plane IMA3. According to the foregoing, wherein: both of the object side surface S320 and image side surface S321 of the optical filter OF3 are plane surfaces; and both of the object side surface S322 and image side surface S323 of the cover glass CG3 are plane surfaces. With the above design of the lenses, stop ST3, and at least one of the conditions (1)-(10) satisfied, the lens assembly 3 can have an effective shortened total lens length, an effective decreased F-number, an effective increased resolution, an effective corrected aberration, and an effective corrected chromatic aberration.

Table 5 shows the optical specification of the lens assembly 3 in FIG. 5.

TABLE 5

Effective Focal Length = 9.70 mm F-number = 1.8
Total Lens Length = 32.998 mm Field of View = 47.728 degrees

| Surface Number | Radius of Curvature (mm) | Thickness (mm) | Nd | Vd | Effective Focal Length (mm) | Remark |
|---|---|---|---|---|---|---|
| S31 | 11.80 | 0.50 | 1.65 | 33.79 | −21.79 | L31 |
| S32 | 6.34 | 1.432 | | | | |
| S33 | 9.01 | 3.558 | 1.92 | 20.88 | 39.7 | L32 |
| S34 | 9.64 | 2.0 | | | | |
| S35 | −10.27 | 0.498 | 1.64 | 34.47 | −8.61 | L33 |
| S36 | 12.25 | 0.405 | | | | |
| S37 | 34.14 | 2.851 | 1.88 | 40.87 | 11.9 | L34 |
| S38 | −14.68 | 1.592 | | | | |
| S39 | ∞ | 0.195 | | | | ST3 |
| S310 | 14.33 | 4.569 | 1.50 | 81.61 | 12.85 | L35 |
| S311 | −10.34 | 0.10 | | | | |
| S312 | 12.18 | 4.165 | 1.73 | 54.68 | 11.87 | L36 |
| S313 | −25.93 | 0.440 | | | | |
| S314 | −12.79 | 0.500 | 1.72 | 29.23 | −7.12 | L37 |
| S315 | 8.83 | 1.063 | | | | |
| S316 | 243.67 | 1.127 | 1.88 | 40.87 | 30.17 | L38 |
| S317 | −29.82 | 0.10 | | | | |
| S318 | 34.83 | 1.190 | 1.77 | 49.60 | 31.45 | L39 |
| S319 | −80.08 | 0.20 | | | | |
| S320 | ∞ | 0.40 | 1.52 | 64.17 | | OF3 |
| S321 | ∞ | 5.513 | | | | |
| S322 | ∞ | 0.50 | 1.52 | 64.17 | | CG3 |
| S323 | ∞ | 0.10 | | | | |

Table 6 shows the parameters and condition values for conditions (1)-(10) in accordance with the third embodiment of the invention. It can be seen from Table 6 that the lens assembly 3 of the third embodiment satisfies the conditions (1)-(10).

TABLE 6

| $f_k$ | 30.17 mm | $f_e$ | 12.85 mm | $f_{34}$ | −62.78 mm |
|---|---|---|---|---|---|
| $f_{67}$ | −34.92 mm | $R_{k2}$ | −29.82 mm | $R_{m2}$ | −80.08 mm |

TABLE 6-continued

| TTL/f | 3.40 | $f/f_5$ | 0.75 | $TTL/R_{11}$ | 2.80 |
|---|---|---|---|---|---|
| $f_{34}/f_{67}$ | 1.80 | Vd2 | 20.88 | Vd4 | 40.87 |
| $(R_{41} - R_{82})/f_4$ | 5.37 | $(R_{k2} - R_{m2})/f_e$ | 3.91 | $f_4 - R_{k2}$ | 41.72 mm |
| $(R_{m2} + f_1)/f_k$ | −3.38 | | | | |

In addition, the lens assembly 3 of the third embodiment can meet the requirements of optical performance as seen in FIGS. 6A-6E. It can be seen from FIG. 6A that the longitudinal aberration in the lens assembly 3 of the third embodiment ranges from −0.01 mm to 0.03 mm. It can be seen from FIG. 6B that the field curvature of tangential direction and sagittal direction in the lens assembly 3 of the third embodiment ranges from −0.02 mm to 0.04 mm. It can be seen from FIG. 6C that the distortion in the lens assembly 3 of the third embodiment ranges from −6% to 0%. It can be seen from FIG. 6D that the lateral color in the lens assembly 3 of the third embodiment ranges from 0 μm to 2.5 μm. It can be seen from FIG. 6E that the modulation transfer function of tangential direction and sagittal direction in the lens assembly 3 of the third embodiment ranges from 0.59 to 1.0. It is obvious that the longitudinal aberration, the field curvature, the distortion, and the lateral color of the lens assembly 3 of the third embodiment can be corrected effectively, and the image resolution of the lens assembly 3 of the third embodiment can meet the requirements. Therefore, the lens assembly 3 of the third embodiment is capable of good optical performance.

Referring to Table 7, Table 9, and Table 11, wherein Table 7, Table 9, and Table 11 show respectively optical specification in accordance with a fourth, fifth, and sixth embodiments of the invention.

Figure 7:
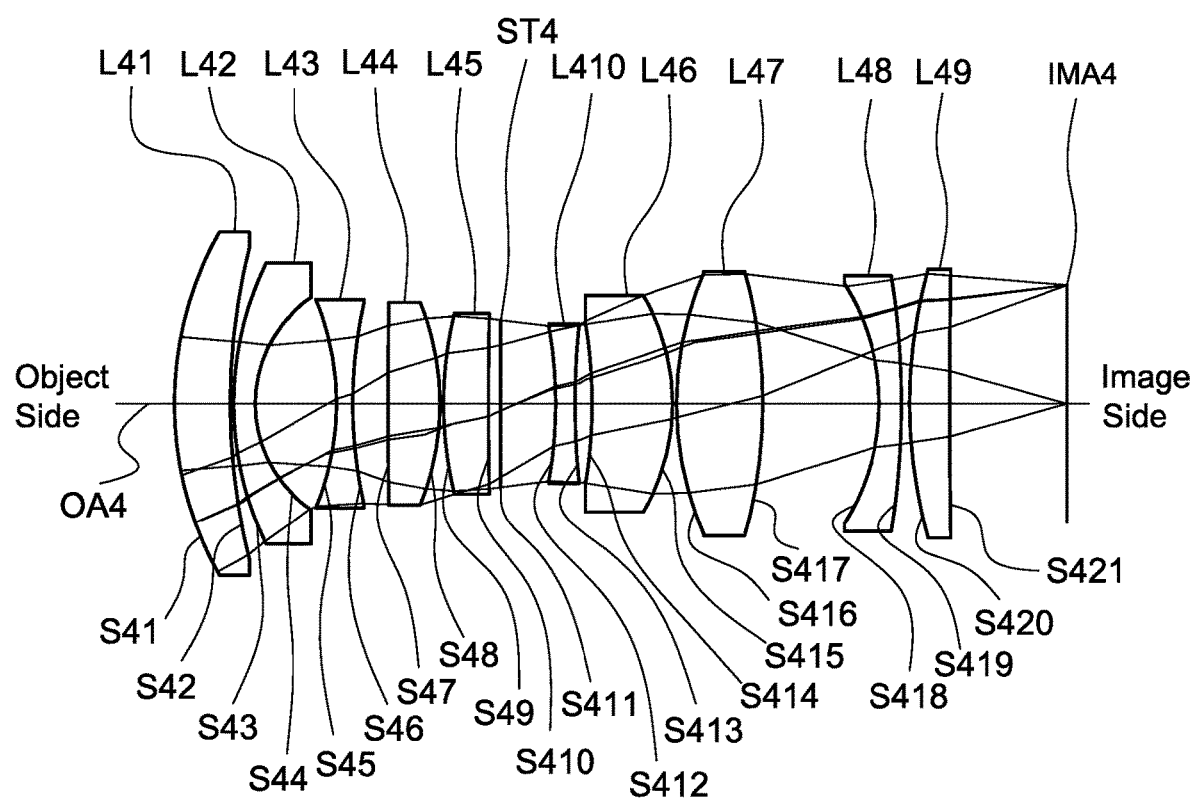
FIG. 7 is a lens layout and optical path diagram of a lens assembly in accordance with a fourth embodiment of the invention.
Figure 9:
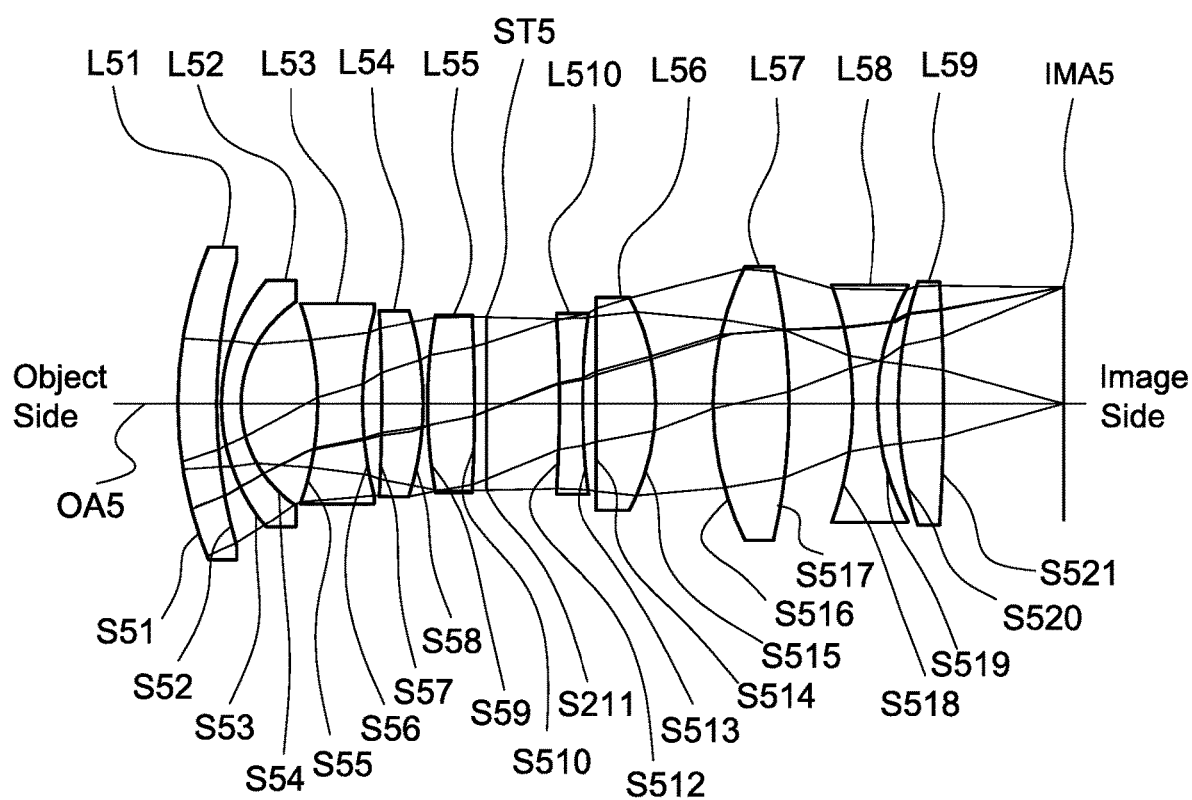
FIG. 9 is a lens layout and optical path diagram of a lens assembly in accordance with a fifth embodiment of the invention.
Figure 11:
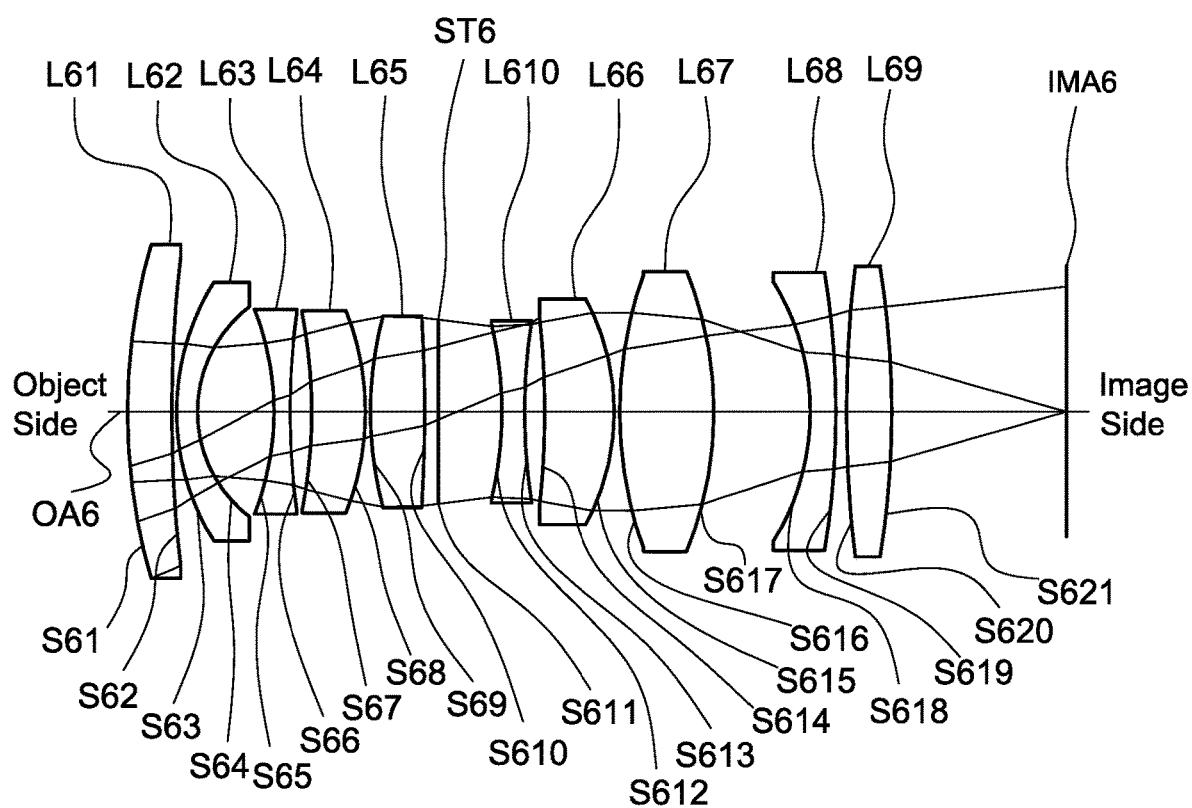
FIG. 11 is a lens layout and optical path diagram of a lens assembly in accordance with a sixth embodiment of the invention.

FIG. 7, FIG. 9, and FIG. 11 are lens layout and optical path diagrams of the lens assemblies in accordance with the fourth, fifth, and sixth embodiments of the invention, respectively.

The first lenses L41, L51, L61 are meniscus lenses with positive refractive power and made of glass material, wherein the object side surfaces S41, S51, S61 are convex surfaces, the image side surfaces S42, S52, S62 are concave surfaces, and both of the object side surfaces S41, S51, S61 and image side surfaces S42, S52, S62 are spherical surfaces.

The second lenses L42, L52, L62 are meniscus lenses with negative refractive power and made of glass material, wherein the object side surfaces S43, S53, S63 are convex surfaces, the image side surfaces S44, S54, S64 are concave surfaces, and both of the object side surfaces S43, S53, S63 and image side surfaces S44, S54, S64 are spherical surfaces.

The third lenses L43, L53, L63 are biconcave lenses with negative refractive power and made of glass material, wherein the object side surfaces S45, S55, S65 are concave surfaces, the image side surfaces S46, S56, S66 are concave surfaces, and both of the object side surfaces S45, S55, S65 and image side surfaces S46, S56, S66 are spherical surfaces.

The fourth lenses L44, L54, L64 are with positive refractive power and made of glass material, wherein the image side surfaces S48, S58, S68 are convex surfaces, and both of the object side surfaces S47, S57, S67 and image side surfaces S48, S58, S68 are spherical surfaces.

The fifth lenses L45, L55, L65 are with positive refractive power and made of glass material, wherein the object side surfaces S49, S59, S69 are convex surfaces and both of the object side surfaces S49, S59, S69 and image side surfaces S410, S510, S610 are spherical surfaces.

The tenth lens L410, L510, L610 are biconcave lenses with negative refractive power and made of glass material, wherein the object side surfaces S412, S512, S612 are concave surfaces, the image side surfaces S413, S513, S613 are concave surfaces, and both of the object side surfaces S412, S512, S612 and image side surfaces S413, S513, S613 are spherical surfaces.

The sixth lenses L46, L46, L46 are meniscus lenses with positive refractive power and made of glass material, wherein the object side surfaces S414, S514, S614 are concave surfaces, the image side surfaces S415, S515, S615 are convex surfaces, and both of the object side surfaces S414, S514, S614 and image side surfaces S415, S515, S615 are spherical surfaces.

The seventh lenses L47, L57, L67 are biconvex lenses with positive refractive power and made of glass material, wherein the object side surfaces S416, S516, S616 are convex surfaces, the image side surfaces S417, S517, S617 are convex surfaces, and both of the object side surfaces S416, S516, S616 and image side surfaces S417, S517, S617 are spherical surfaces.

The eighth lenses L48, L58, L68 are with negative refractive power and made of glass material, wherein the object side surfaces S418, S518, S618 are concave surfaces and both of the object side surfaces S418, S518, S618 and image side surfaces S419, S519, S619 are spherical surfaces.

The ninth lenses L49, L59, L69 are with positive refractive power and made of glass material, wherein the object side surfaces S420, S520, S620 are convex surfaces and both of the object side surfaces S420, S520, S620 and image side surfaces S421, S521, S621 are spherical surfaces.

In addition, the lens assemblies 5, 6, 7 satisfy at least one of the conditions (1), (6)-(10) and the following conditions:

$$-10 \text{ mm} < f_e - f_k < 10 \text{ mm}; \quad (11)$$

$$0.4 < R_{11}/R_{12} < 0.8; \quad (12)$$

$$48 \text{ mm} < f_1 + f_4 < 108 \text{ mm}; \quad (13)$$

$$-2.2 < R_{k2}/(f_1 + f_k) < 0.13; \quad (14)$$

$$2.4 < TTL/f_r < 2.7; \quad (15)$$

$$50 \text{ mm} < f_1 - f_k < 100 \text{ mm}; \quad (16)$$

$$3.1 \text{ mm} < R_{11} + R_{31} < 12.2 \text{ mm}; \quad (17)$$

$$-0.31 < R_{31}/f_1 < -0.13; \quad (18)$$

wherein $f_r$ is an effective focal length of a combination of the tenth lenses L410, L510, L610, the sixth lenses L46, L56, L66, the seventh lenses L47, L57, L67, the eighth lenses L48, L58, L68, and the ninth lenses L49, L59, L69 for the fourth to sixth embodiments, $R_{12}$ is a radius of curvature of the image side surfaces S42, S52, S62 of the first lenses L41, L51, L61 for the fourth to sixth embodiments, $R_{31}$ is a radius of curvature of the object side surfaces S45, S55, S65 of the third lenses L43, L53, L63 for the fourth to sixth embodiments, and the definition of the other parameters are the same as that of in paragraph [0061]. With the lens assemblies 4, 5, 6 satisfying at least one of the above conditions (1), (6)-(18), the total lens length can be effectively shortened, the resolution can be effectively increased, the environmental temperature change can be effectively resisted, the aberration can be effectively corrected, and the chromatic aberration can be effectively corrected.

When the condition (11): $-10 \text{ mm} < f_e - f_k < 10 \text{ mm}$ is satisfied, the coma and the field of curvature can be corrected effectively.

When the condition (7): $-4.3 < (R_{41} - R_{82})/f_4 < 25$ is satisfied, the lateral color can be corrected effectively.

When the condition (8): $-5.2 < (R_{k2} - R_{m2})/f_e < 37.6$ is satisfied, the high order system aberration and the lateral color can be corrected effectively.

When the condition (9): $10 \text{ mm} < f_4 - R_{k2} < 56.5 \text{ mm}$ is satisfied, the lateral color can be corrected effectively.

When the condition (12): $0.4 < R_{11}/R_{12} < 0.8$ is satisfied, the distortion can be corrected effectively and the yield of the lens assembly can be improved effectively.

When the condition (13): $48 \text{ mm} < f_1 + f_4 < 108 \text{ mm}$ is satisfied, the volume of the lens assembly can be decreased effectively by way of high refractive power of the first lens and the fourth lens.

When the condition (14): $-2.2 < R_{k2}/(f_1 + f_k) < 0.13$ is satisfied, the off-axis aberration and astigmatism can be corrected effectively.

When the condition (10): $-22 < (R_{m2} + f_1)/f_k < -1$ is satisfied, the volume of the lens assembly and the system sensitivity can be decreased effectively.

When the condition (15): $2.4 < TTL/f_r < 2.7$ is satisfied, the shortest total lens length of the lens assembly can be ensured effectively.

When the condition (16): $50 \text{ mm} < f_1 - f_k < 100 \text{ mm}$ is satisfied, the astigmatism can be corrected effectively.

When the condition (17): $3.1 \text{ mm} < R_{11} + R_{31} < 12.2 \text{ mm}$ is satisfied, the off-axis chromatic aberration can be corrected effectively.

When the condition (18): $-0.31 < R_{31}/f_1 < -0.13$ is satisfied, the distortion and off-axis chromatic aberration can be corrected effectively.

All glass and spherical surface design helps to make the above conditions working and allow the lens assembly maintaining high performance under high or low temperature environment.

A detailed description of a lens assembly in accordance with a fourth embodiment of the invention is as follows. Referring to FIG. 7, the lens assembly 4 includes a first lens L41, a second lens L42, a third lens L43, a fourth lens L44, a fifth lens L45, a stop ST4, a tenth lens L410, a sixth lens L46, a seventh lens L47, an eighth lens L48, and a ninth lens L49, all of which are arranged in order from an object side to an image side along an optical axis OA5. In operation, the light from the object side is imaged on an image plane IMA4.

According to the foregoing, wherein: the fourth lens L44 is biconvex lens, wherein the object side surface S47 is a convex surface; the fifth lens L45 is a meniscus lens, wherein the image side surface S410 is a concave surface; the eighth lens L48 is a meniscus lens, wherein the image side surface S419 is a convex surface; and the ninth lens L49 is a meniscus lens, wherein the image side surface S421 is a concave surface. With the above design of the lenses, stop ST4, and at least one of the conditions (1), (6)-(18) satisfied, the lens assembly 4 can have an effective shortened total lens length, an effective increased resolution, an effective resisted environmental temperature change, an effective corrected aberration, and an effective corrected chromatic aberration.

Table 7 shows the optical specification of the lens assembly 4 in FIG. 7.

TABLE 7

Effective Focal Length = 9.686 mm F-number = 1.857
Total Lens Length = 35 mm Field of View = 54.857 degrees

| Surface Number | Radius of Curvature (mm) | Thickness (mm) | Nd | Vd | Effective Focal Length (mm) | Remark |
|---|---|---|---|---|---|---|
| S41 | 13.72 | 2.17 | 1.80 | 46.00 | 34.93 | L41 |
| S42 | 24.95 | 0.14 | | | | |
| S43 | 12.40 | 0.85 | 1.50 | 81.00 | −17.44 | L42 |
| S44 | 5.01 | 3.21 | | | | |
| S45 | −10.48 | 0.63 | 1.64 | 60.00 | −10.21 | L43 |
| S46 | 17.90 | 1.39 | | | | |
| S47 | 297.91 | 2.03 | 1.75 | 52.00 | 13.42 | L44 |
| S48 | −10.42 | 0.13 | | | | |
| S49 | 14.48 | 1.77 | 1.88 | 41.00 | 17.34 | L45 |
| S410 | 249.36 | 0.47 | | | | |
| S411 | ∞ | 2.16 | | | | ST4 |
| S412 | −16.51 | 0.75 | 1.92 | 20.00 | −11.38 | L410 |
| S413 | 30.00 | 0.70 | | | | |
| S414 | −19.08 | 3.16 | 1.60 | 70.00 | 22.21 | L46 |
| S415 | −8.35 | 0.15 | | | | |
| S416 | 12.77 | 3.39 | 1.60 | 72.00 | 13.19 | L47 |
| S417 | −18.86 | 4.57 | | | | |
| S418 | −8.65 | 0.88 | 1.60 | 43.00 | −20.00 | L48 |
| S419 | −31.74 | 0.32 | | | | |
| S420 | 19.44 | 1.58 | 1.90 | 41.00 | 22.59 | L49 |
| S421 | 390.86 | 4.57 | | | | |

Table 8 shows the parameters and condition values for conditions (1), (6)-(18) in accordance with the fourth embodiment of the invention. It can be seen from Table 8 that the lens assembly 4 of the fourth embodiment satisfies the conditions (1), (6)-(18).

TABLE 8

| | | | | | |
|---|---|---|---|---|---|
| $f_k$ | −20.00 mm | $f_e$ | −11.38 mm | $f_r$ | 14.45 mm |
| $R_{k2}$ | −31.74 mm | $R_{m2}$ | 390.86 mm | | |
| Vd4 | 52.00 | $(R_{41} - R_{82})/f_4$ | 24.56 | $(R_{k2} - R_{m2})/f_e$ | 37.14 |
| $f_4 - R_{k2}$ | 45.16 mm | $(R_{m2} + f_1)/f_k$ | −21.29 | $f_e - f_k$ | 8.62 mm |
| $R_{11}/R_{12}$ | 0.55 | $f_1 + f_4$ | 48.35 mm | $R_{k2}/(f_1 + f_k)$ | −2.13 |
| TTL/$f_r$ | 2.42 | $f_1 - f_k$ | 54.93 mm | $R_{11} + R_{31}$ | 3.24 mm |
| $R_{31}/f_1$ | −0.30 | TTL/f | 3.61 | | |

Figure 8A:
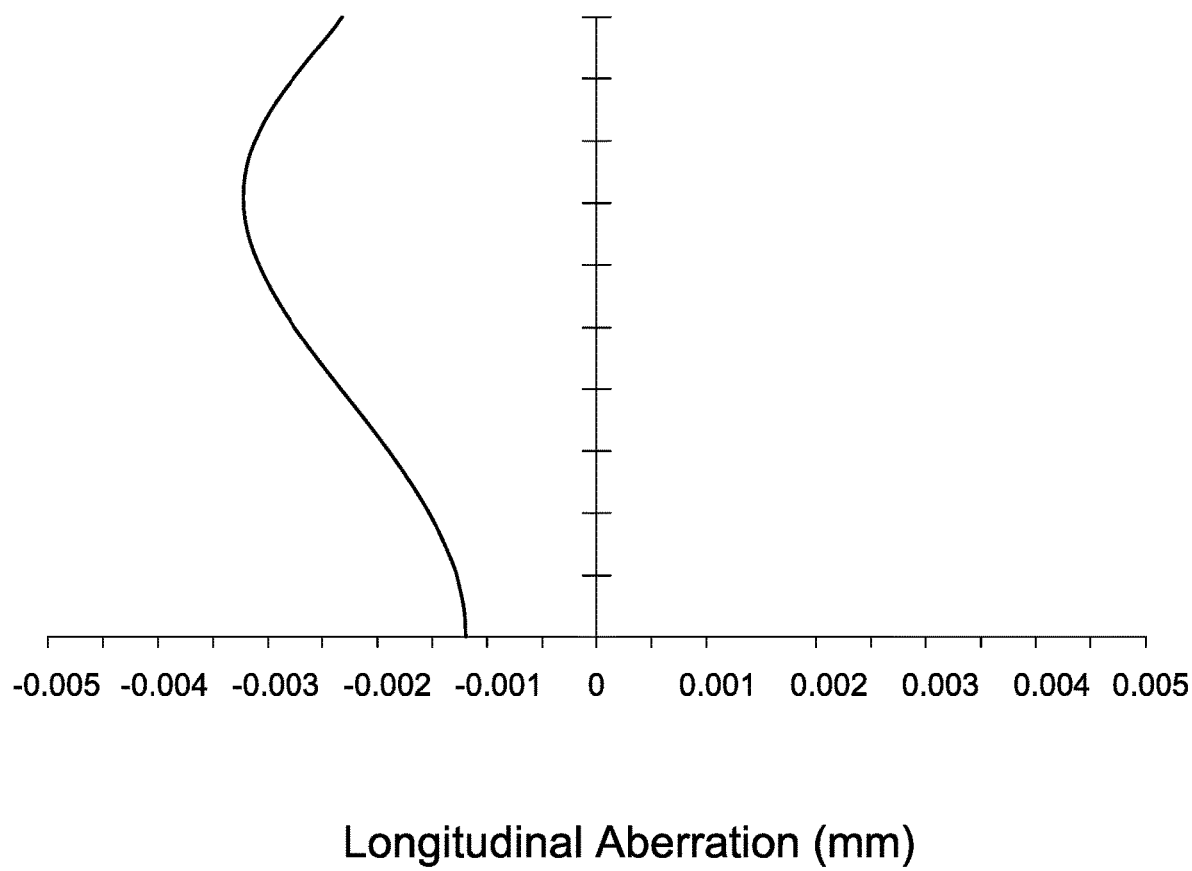
FIG. 8A, FIG. 8B, and FIG. 8C depict a longitudinal aberration diagram, a field curvature diagram, and a distortion diagram of the lens assembly in accordance with the fourth embodiment of the invention, respectively.
Figure 8B:
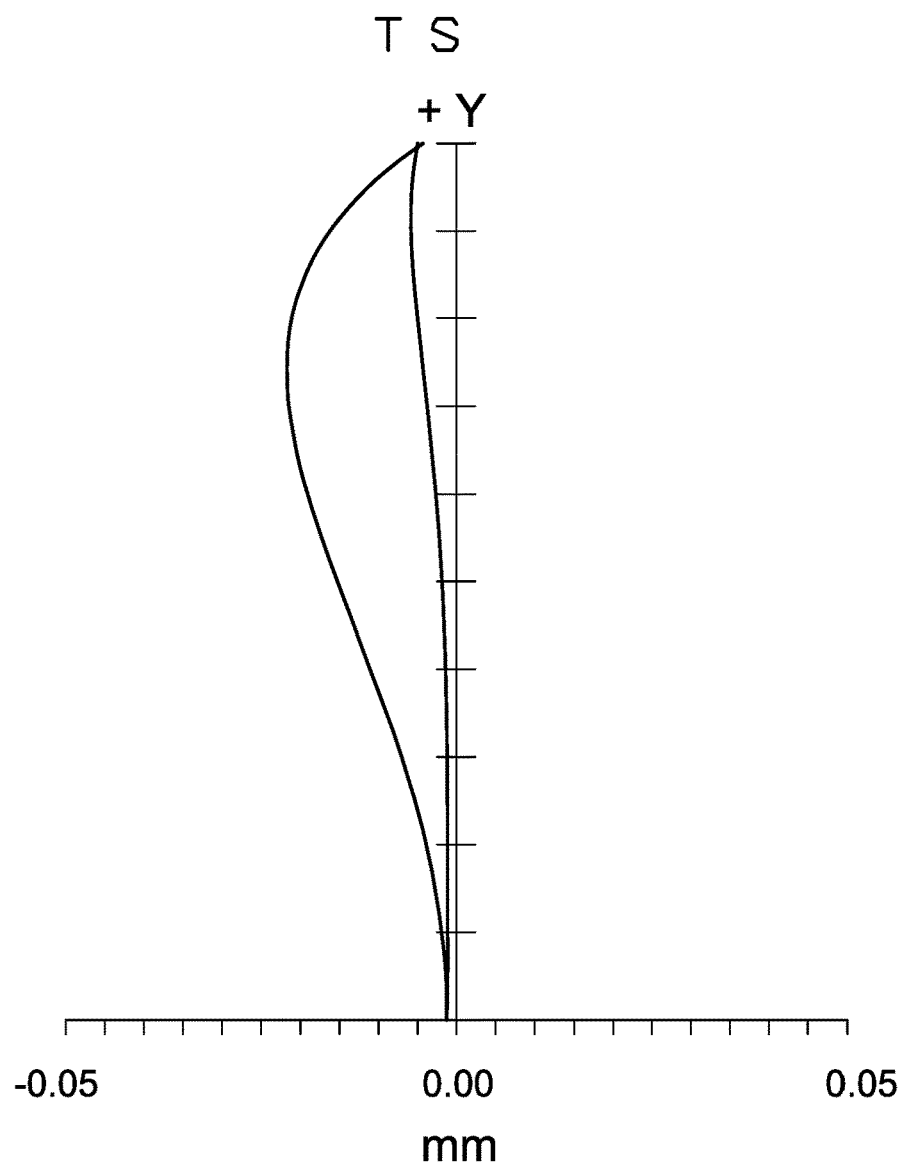
Figure 8C:
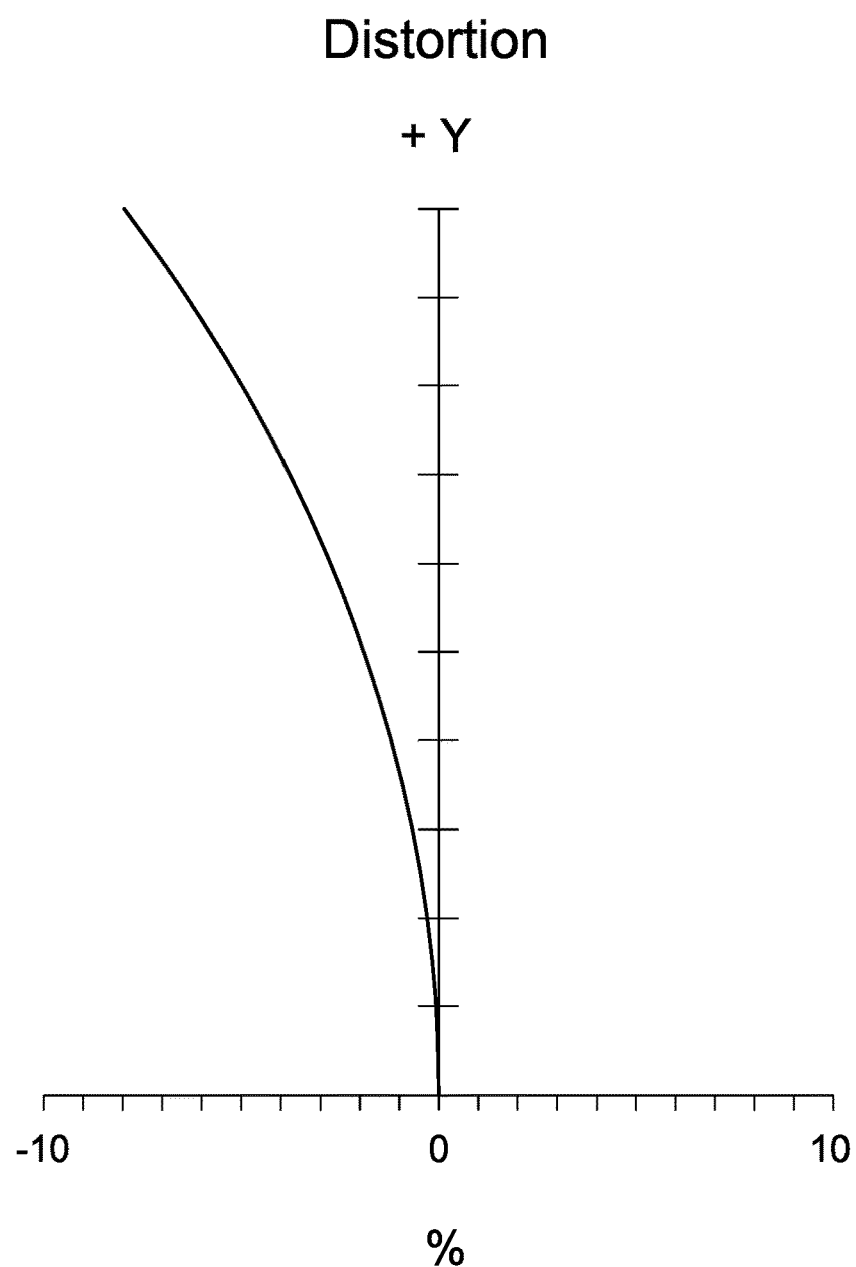

In addition, the lens assembly 4 of the fourth embodiment can meet the requirements of optical performance as seen in FIGS. 8A-8C. It can be seen from FIG. 8A that the longitudinal aberration in the lens assembly 4 of the fourth embodiment ranges from −0.0035 mm to −0.0010 mm. It can be seen from FIG. 8B that the field curvature of tangential direction and sagittal direction in the lens assembly 4 of the fourth embodiment ranges from −0.025 mm to 0.00 mm. It can be seen from FIG. 8C that the distortion in the lens assembly 4 of the fourth embodiment ranges from −8% to 0%. It is obvious that the longitudinal aberration, the field curvature, and the distortion of the lens assembly 4 of the fourth embodiment can be corrected effectively. Therefore, the lens assembly 4 of the fourth embodiment is capable of good optical performance.

Referring to FIG. 9, the lens assembly 5 includes a first lens L51, a second lens L52, a third lens L53, a fourth lens L54, a fifth lens L55, a stop ST5, a tenth lens L510, a sixth lens L56, a seventh lens L57, an eighth lens L58, and a ninth lens L59, all of which are arranged in order from an object side to an image side along an optical axis OA5. In operation, the light from the object side is imaged on an image plane IMA5. According to the foregoing, wherein: the fourth lens L54 is a meniscus lens, wherein the object side surface S57 is a concave surface; the fifth lens L55 is a biconvex lens, wherein the image side surface S510 is a convex surface; the eighth lens L58 is a biconcave lens, wherein the image side surface S519 is a concave surface; and the ninth lens L59 is a biconvex lens, wherein the image side surface S521 is a convex surface.

With the above design of the lenses, stop ST5, and at least one of the conditions (1), (6)-(18) satisfied, the lens assembly 5 can have an effective shortened total lens length, an effective increased resolution, an effective resisted environmental temperature change, an effective corrected aberration, and an effective corrected chromatic aberration.

Table 9 shows the optical specification of the lens assembly 5 in FIG. 9

TABLE 9

Effective Focal Length = 9.7 mm F-number = 1.857
Total Lens Length = 35 mm Field of View = 54.81 degrees

| Surface Number | Radius of Curvature (mm) | Thickness (mm) | Nd | Vd | Effective Focal Length (mm) | Remark |
|---|---|---|---|---|---|---|
| S51 | 16.64 | 1.53 | 1.80 | 42.00 | 87.37 | L51 |
| S52 | 20.92 | 0.19 | | | | |
| S53 | 7.73 | 0.78 | 1.50 | 80.00 | −28.74 | L52 |
| S54 | 4.86 | 3.03 | | | | |
| S55 | −12.06 | 1.78 | 1.64 | 60.00 | −10.16 | L53 |
| S56 | 15.02 | 0.75 | | | | |
| S57 | −67.75 | 1.63 | 1.75 | 52.00 | 19.90 | L54 |
| S58 | −12.39 | 0.18 | | | | |
| S59 | 20.31 | 1.84 | 1.88 | 40.00 | 17.95 | L55 |
| S510 | −69.43 | 0.48 | | | | |
| S511 | ∞ | 2.89 | | | | ST5 |
| S512 | −41.38 | 0.91 | 1.90 | 20.00 | −18.09 | L510 |
| S513 | 27.53 | 0.54 | | | | |
| S514 | −23394.91 | 2.35 | 1.60 | 70.00 | 15.13 | L56 |
| S515 | −9.10 | 2.26 | | | | |
| S516 | 12.33 | 3.01 | 1.70 | 56.00 | 11.99 | L57 |
| S517 | −23.88 | 2.51 | | | | |
| S518 | −13.87 | 1.00 | 1.65 | 33.00 | −8.58 | L58 |
| S519 | 9.69 | 0.81 | | | | |
| S520 | 15.42 | 1.79 | 1.88 | 40.00 | 14.63 | L59 |
| S521 | −75.84 | 4.74 | | | | |

Table 10 shows the parameters and condition values for conditions (1), (6)-(18) in accordance with the fifth embodiment of the invention. It can be seen from Table 10 that the lens assembly 5 of the fifth embodiment satisfies the conditions (1), (6)-(18).

TABLE 10

| | | | | | |
|---|---|---|---|---|---|
| $f_k$ | −8.58 mm | $f_e$ | −18.09 mm | $f_r$ | 13.40 mm |
| $R_{k2}$ | 9.69 mm | $R_{m2}$ | −75.84 mm | | |
| Vd4 | 52.00 | $(R_{41} - R_{82})/f_4$ | −3.89 | $(R_{k2} - R_{m2})/f_e$ | −4.73 |
| $f_4 - R_{k2}$ | 10.21 mm | $(R_{m2} + f_1)/f_k$ | −1.34 | $f_e - f_k$ | −9.51 mm |
| $R_{11}/R_{12}$ | 0.80 | $f_1 + f_4$ | 107.27 mm | $R_{k2}/(f_1 + f_k)$ | 0.12 |
| TTL/$f_r$ | 2.61 | $f_1 - f_k$ | 95.95 mm | $R_{11} + R_{31}$ | 4.58 mm |
| $R_{31}/f_1$ | −0.14 | TTL/f | 3.61 | | |

Figure 10A:
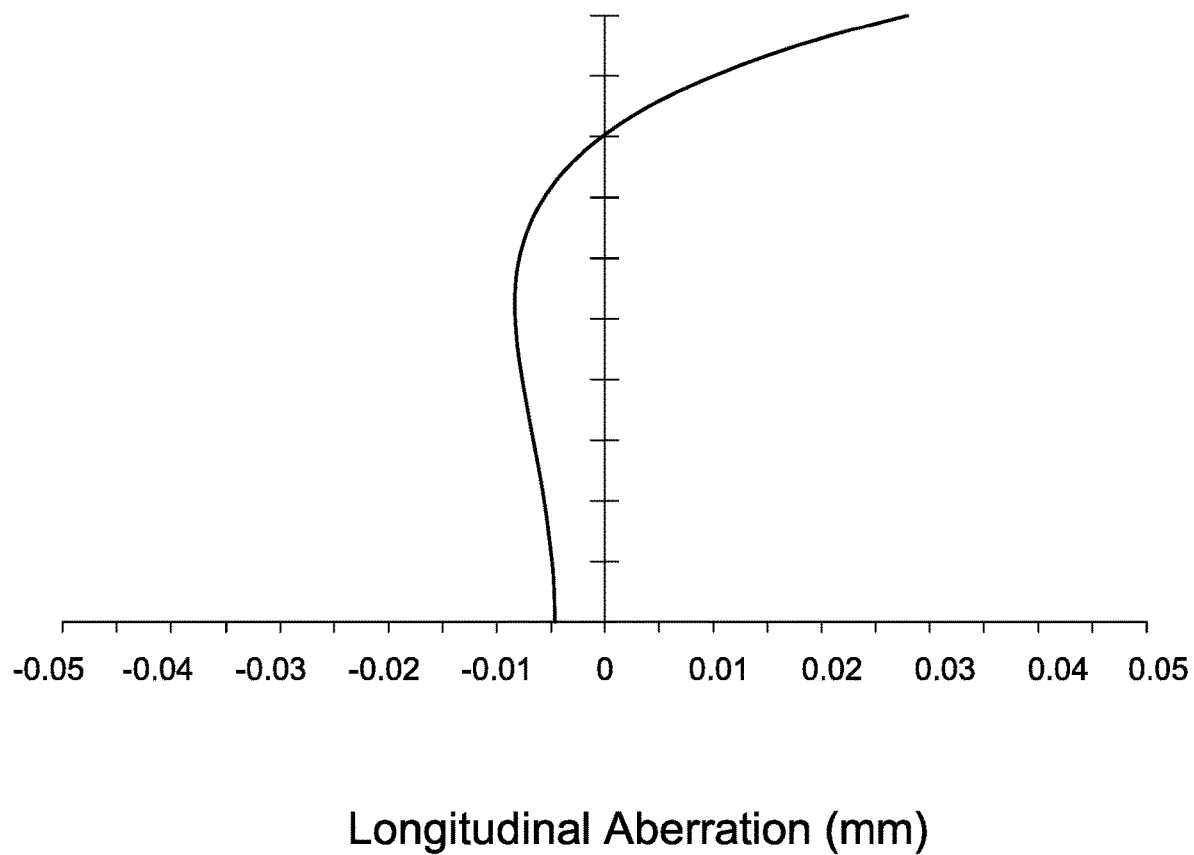
FIG. 10A, FIG. 10B, and FIG. 10C depict a longitudinal aberration diagram, a field curvature diagram, and a distortion diagram of the lens assembly in accordance with the fifth embodiment of the invention, respectively.
Figure 10B:
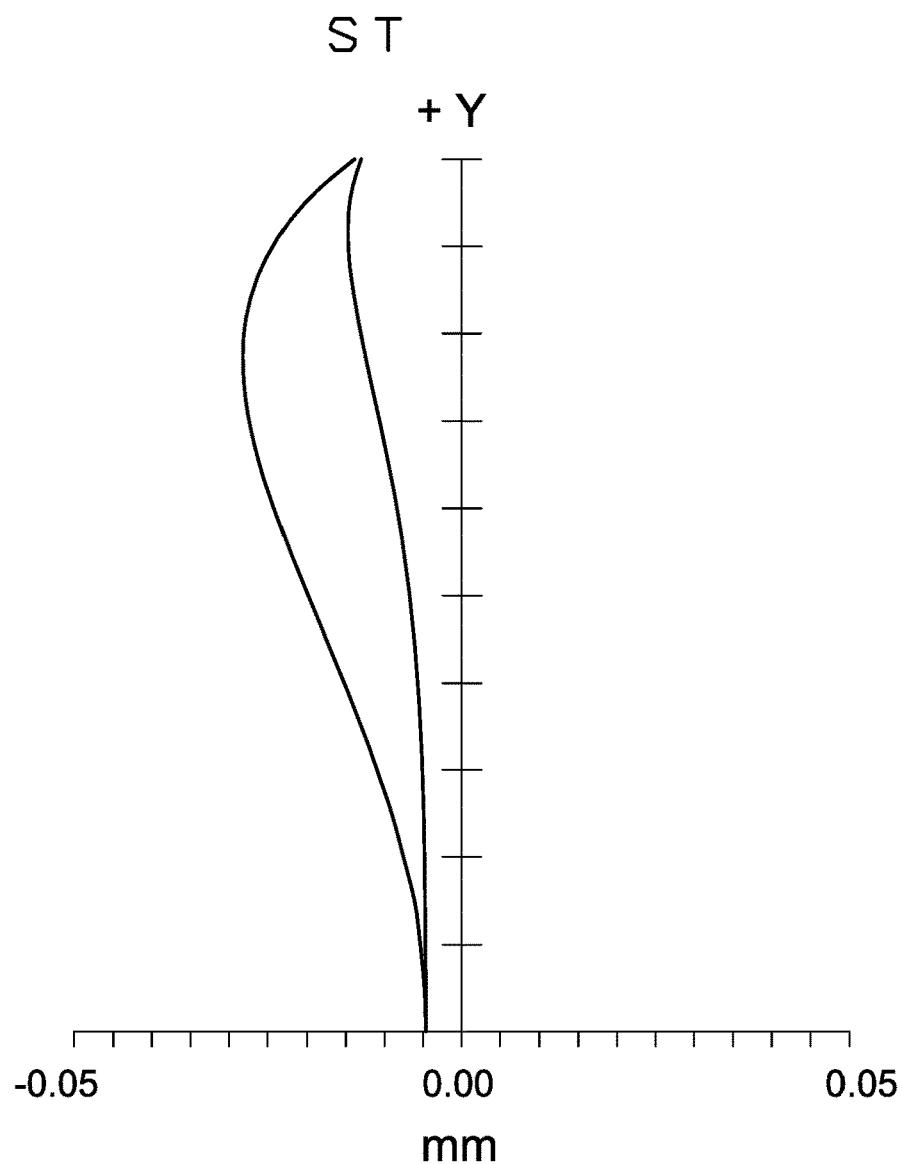
Figure 10C:
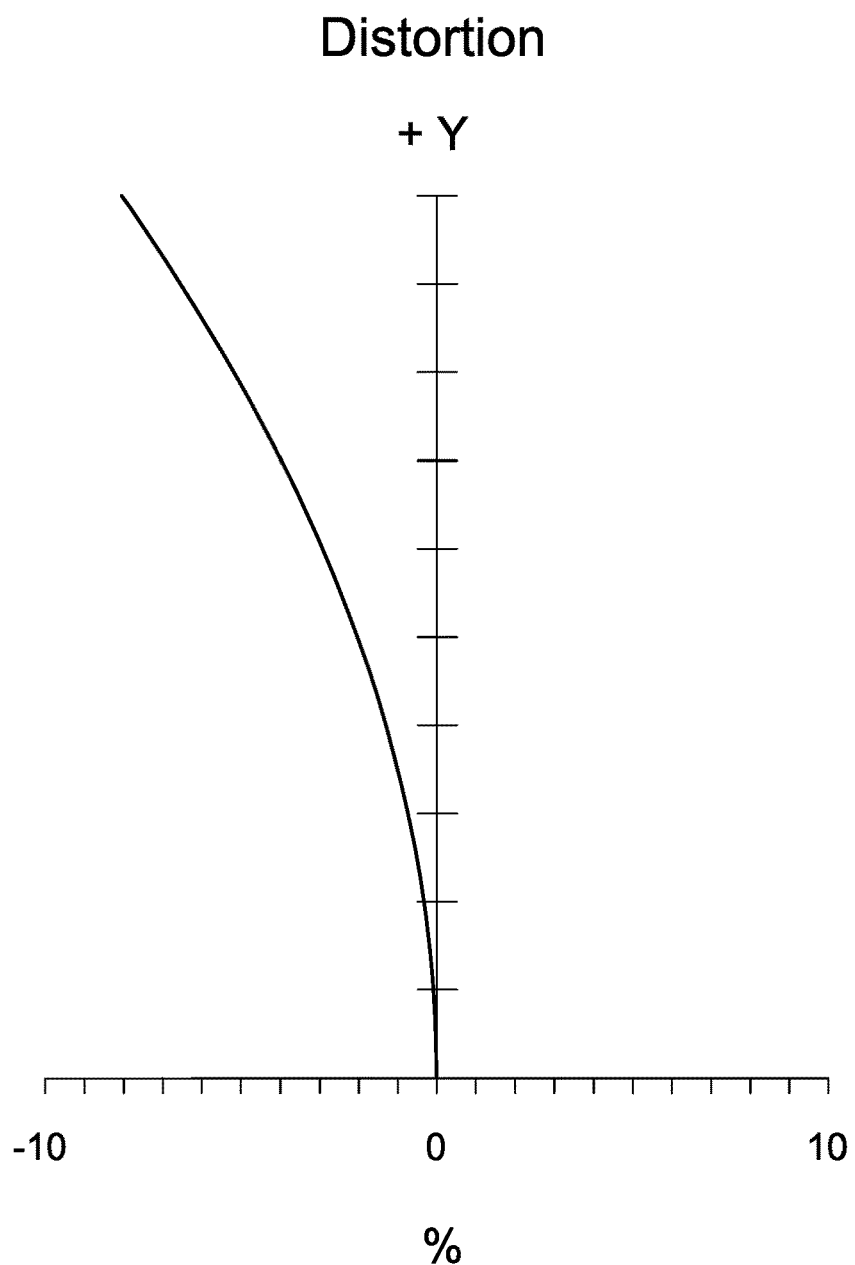

In addition, the lens assembly 5 of the fifth embodiment can meet the requirements of optical performance as seen in FIGS. 10A-10C. It can be seen from FIG. 10A that the longitudinal aberration in the lens assembly 5 of the fifth embodiment ranges from −0.01 mm to 0.03 mm. It can be seen from FIG. 10B that the field curvature of tangential direction and sagittal direction in the lens assembly 5 of the fifth embodiment ranges from −0.03 mm to 0.00 mm. It can be seen from FIG. 10C that the distortion in the lens assembly 5 of the fifth embodiment ranges from −8% to 0%. It is obvious that the longitudinal aberration, the field curvature, and the distortion of the lens assembly 5 of the fifth embodiment can be corrected effectively. Therefore, the lens assembly 5 of the fifth embodiment is capable of good optical performance.

Referring to FIG. 11, the lens assembly 6 includes a first lens L61, a second lens L62, a third lens L63, a fourth lens L64, a fifth lens L65, a stop ST6, a tenth lens L610, a sixth lens L66, a seventh lens L67, an eighth lens L68, and a ninth lens L69, all of which are arranged in order from an object side to an image side along an optical axis OA6. In operation, the light from the object side is imaged on an image plane IMA6. According to the foregoing, wherein: the fourth lens L64 is a meniscus lens, wherein the object side surface S67 is a concave surface; the fifth lens L65 is a biconvex lens, wherein the image side surface S610 is a convex surface; the eighth lens L68 is a meniscus lens, wherein the image side surface S619 is a convex surface; and the ninth lens L69 is a biconvex lens, wherein the image side surface S621 is a convex surface. With the above design of the lenses, stop ST6, and at least one of the conditions (1), (6)-(18) satisfied, the lens assembly 6 can have an effective shortened total lens length, an effective increased resolution, an effective resisted environmental temperature change, an effective corrected aberration, and an effective corrected chromatic aberration.

Table 11 shows the optical specification of the lens assembly 6 in FIG. 11.

TABLE 11

Effective Focal Length = 9.684 mm F-number = 1.86
Total Lens Length = 35 mm Field of View = 54.684 degrees

| Surface Number | Radius of Curvature (mm) | Thickness (mm) | Nd | Vd | Effective Focal Length (mm) | Remark |
|---|---|---|---|---|---|---|
| S61 | 22.36 | 1.64 | 1.75 | 52.00 | 54.07 | L61 |
| S62 | 48.08 | 0.20 | | | | |
| S63 | 9.05 | 0.76 | 1.50 | 80.00 | −22.08 | L62 |
| S64 | 4.84 | 2.85 | | | | |
| S65 | −10.20 | 0.60 | 1.64 | 60.00 | −11.15 | L63 |
| S66 | 24.61 | 0.82 | | | | |
| S67 | −18.97 | 2.00 | 1.80 | 46.00 | 24.56 | L64 |
| S68 | −10.13 | 0.20 | | | | |
| S69 | 13.86 | 2.02 | 1.88 | 40.00 | 12.42 | L65 |
| S610 | −49.19 | 0.50 | | | | |
| S611 | ∞ | 2.37 | | | | ST6 |
| S612 | −13.63 | 0.84 | 1.80 | 22.00 | −10.13 | L610 |
| S613 | 20.97 | 0.74 | | | | |
| S614 | −33.69 | 2.62 | 1.56 | 70.00 | 19.64 | L66 |
| S615 | −8.54 | 0.20 | | | | |
| S616 | 14.75 | 3.50 | 1.60 | 70.00 | 12.40 | L67 |
| S617 | −13.73 | 3.59 | | | | |
| S618 | −9.03 | 0.96 | 1.64 | 33.00 | −20.00 | L68 |
| S619 | −31.52 | 0.40 | | | | |
| S620 | 45.61 | 1.71 | 1.88 | 40.00 | 21.86 | L69 |
| S621 | −32.93 | 6.50 | | | | |

Table 12 shows the parameters and condition values for conditions (1), (6)-(18) in accordance with the sixth embodiment of the invention. It can be seen from Table 12 that the lens assembly 6 of the sixth embodiment satisfies the conditions (1), (6)-(18).

TABLE 12

| $f_k$ | −20.00 mm | $f_e$ | −10.13 mm | $f_r$ | 14.26 mm |
|---|---|---|---|---|---|
| $R_{k2}$ | −31.52 mm | $R_{m2}$ | −32.93 mm | | |
| Vd4 | 46.00 | $(R_{41} - R_{82})/f_4$ | 0.51 | $(R_{k2} - R_{m2})/f_e$ | −0.14 |
| $f_4 - R_{k2}$ | 56.08 mm | $(R_{m2} + f_1)/f_k$ | −1.06 | $f_e - f_k$ | 9.87 mm |
| $R_{11}/R_{12}$ | 0.47 | $f_1 + f_4$ | 78.63 mm | $R_{k2}/(f_1 + f_k)$ | −0.93 |
| $TTL/f_r$ | 2.45 | $f_1 - f_k$ | 74.07 mm | $R_{11} + R_{31}$ | 12.16 mm |
| $R_{31}/f_1$ | −0.19 | TTL/f | 3.61 | | |

Figure 12A:
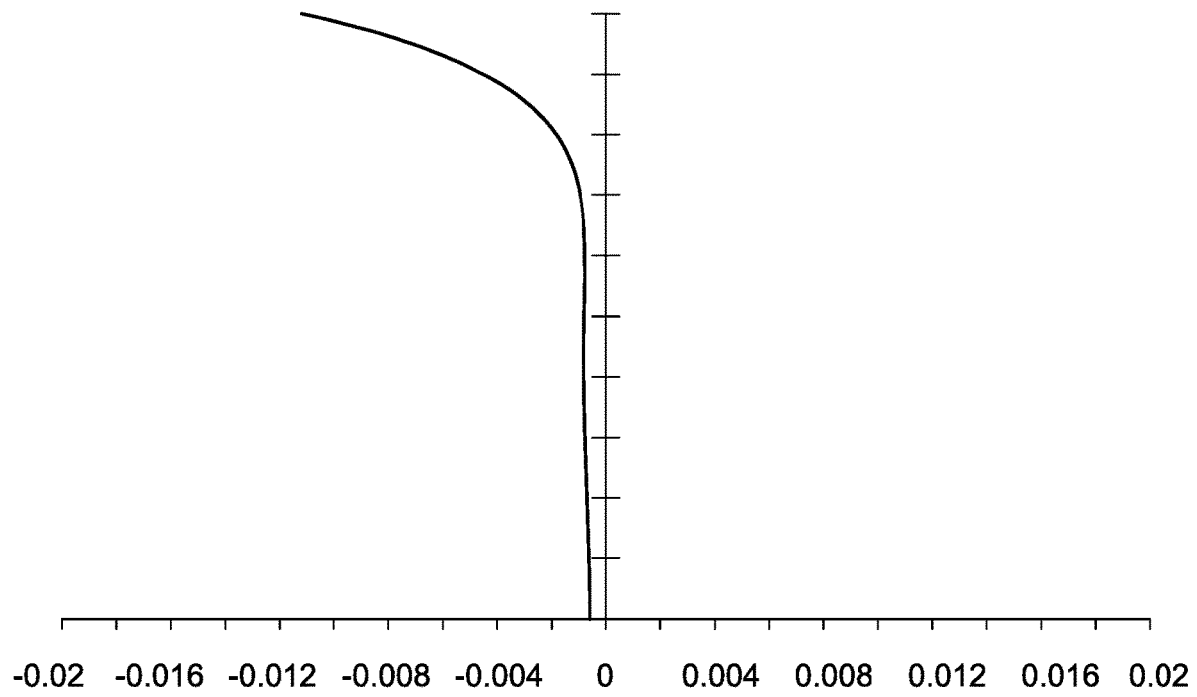
FIG. 12A, FIG. 12B, and FIG. 12C depict a longitudinal aberration diagram, a field curvature diagram, and a distortion diagram of the lens assembly in accordance with the sixth embodiment of the invention, respectively.
Figure 12B:
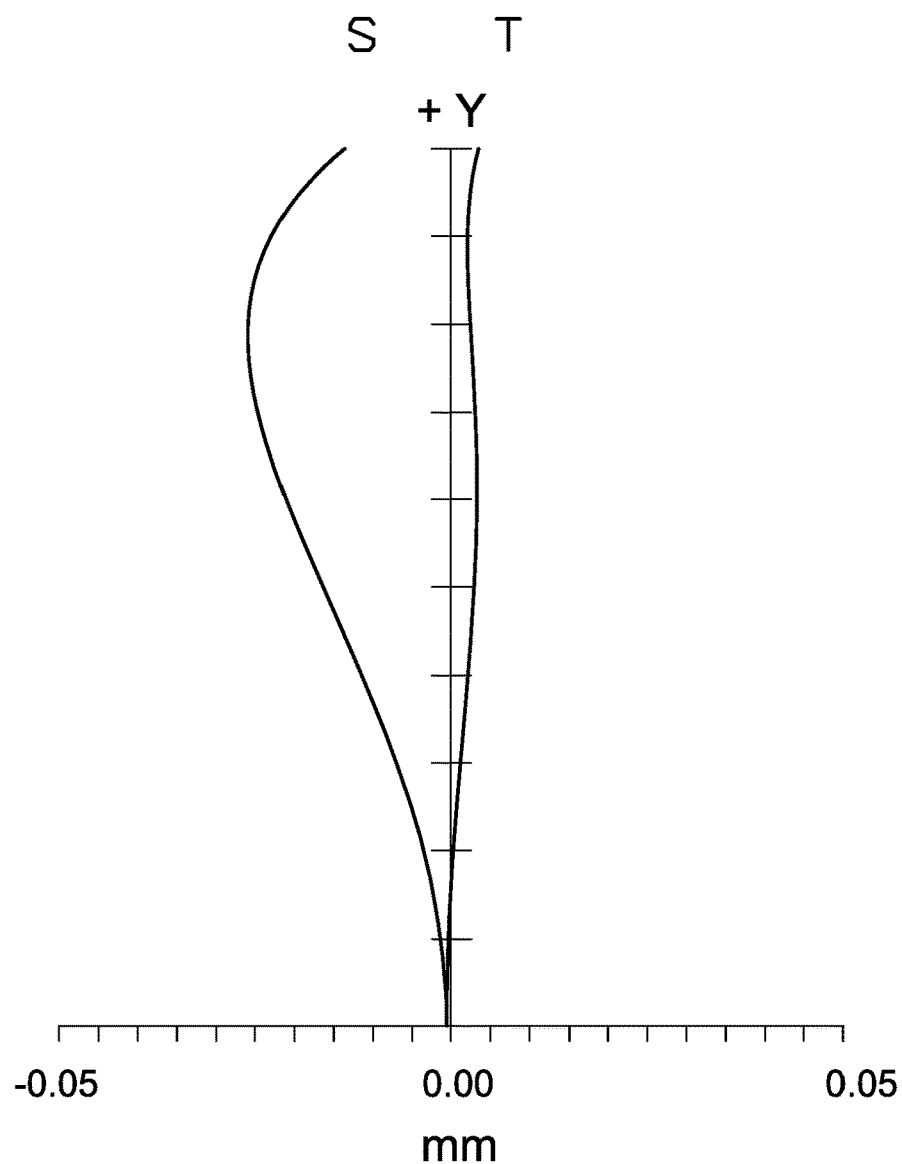
Figure 12C:
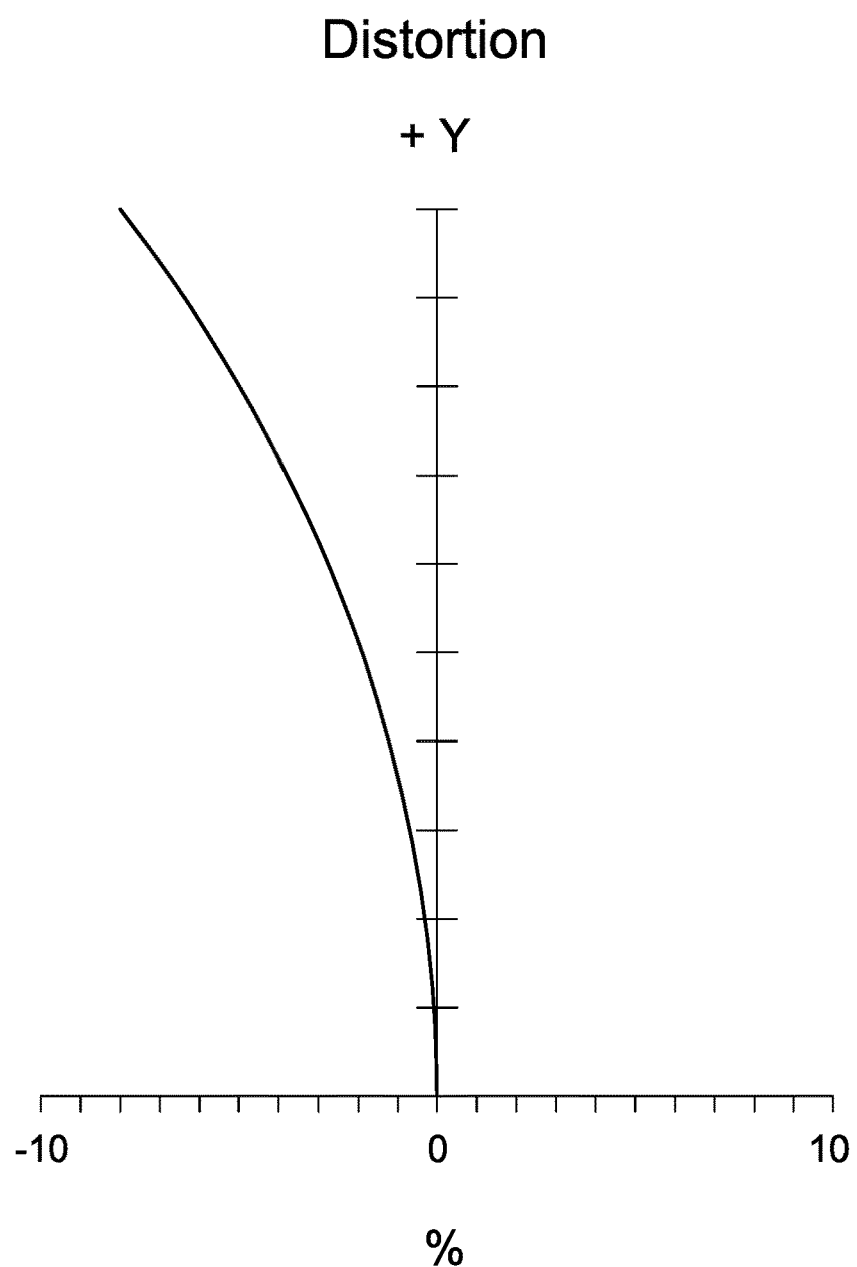

In addition, the lens assembly 6 of the sixth embodiment can meet the requirements of optical performance as seen in FIGS. 12A-12C. It can be seen from FIG. 12A that the longitudinal aberration in the lens assembly 6 of the sixth embodiment ranges from −0.012 mm to 0.00 mm. It can be seen from FIG. 12B that the field curvature of tangential direction and sagittal direction in the lens assembly 6 of the sixth embodiment ranges from −0.03 mm to 0.005 mm. It can be seen from FIG. 12C that the distortion in the lens assembly 6 of the sixth embodiment ranges from −8% to 0%. It is obvious that the longitudinal aberration, the field curvature, and the distortion of the lens assembly 6 of the sixth embodiment can be corrected effectively. Therefore, the lens assembly 6 of the sixth embodiment is capable of good optical performance.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens assembly comprising:
   a first lens which is a meniscus lens with refractive power;
   a second lens which is with refractive power and comprises a concave surface facing an image side;
   a third lens which is with negative refractive power and comprises a concave surface facing an object side;
   a fourth lens which is with positive refractive power;
   a fifth lens which is with positive refractive power and comprises a convex surface facing the object side;
   a sixth lens which is with positive refractive power and comprises a convex surface facing the image side;
   a seventh lens which is with refractive power;
   an eighth lens which is with refractive power and comprises a convex surface facing the image side; and
   a ninth lens which is with positive refractive power and comprises a convex surface facing the object side;
   wherein the refractive power of the first lens and the refractive power of the second lens are opposite in sign;
   wherein the first lens, the second lens, the third lens, the fourth lens, the fifth lens, the sixth lens, the seventh lens, the eighth lens, and the ninth lens are arranged in order from the object side to the image side along an optical axis;
   wherein the lens assembly satisfies at least one of following conditions:

$Vd4 > 35$;

$10 \text{ mm} \leq f_4 - R_{k2} \leq 56.5 \text{ mm}$;

wherein Vd4 is an Abbe number of the fourth lens, $f_4$ is an effective focal length of the fourth lens, $R_{k2}$ is a radius of curvature of an image side surface of the lens second close to the image side;
wherein the lens assembly satisfies following conditions:

$$-22<(R_{m2}+f_1)/f_k<-1;$$

wherein $f_1$ is an effective focal length of the first lens, $f_k$ is an effective focal length of the lens second close to the image side, and $R_{m2}$ is a radius of curvature of an image side surface of the lens closest to the image side;
wherein an air gap is disposed between the sixth lens and the seventh lens;
wherein the lens assembly further satisfies:

$$3.0 \leq TTL/f \leq 3.8;$$

wherein f is an effective focal length of the lens assembly and TTL is an interval from an object side surface of the first lens to an image plane along the optical axis.

2. The lens assembly as claimed in claim 1, wherein the refractive power of the seventh lens and the refractive power of the eighth lens are opposite in sign.

3. The lens assembly as claimed in claim 2, wherein:
the fourth lens comprises a convex surface facing the object side; and
the sixth lens further comprises another convex surface facing the object side.

4. The lens assembly as claimed in claim 3, further comprising a stop disposed between the fourth lens and the sixth lens, wherein:
the first lens comprises a convex surface facing the object side and a concave surface facing the image side;
the second lens is a meniscus lens and comprises a convex surface facing the object side;
the third lens is a biconcave lens and further comprises another concave surface facing the image side; and
the fourth lens is a biconvex lens and further comprises another convex surface facing the image side.

5. The lens assembly as claimed in claim 4, wherein the lens assembly satisfies at least one of following conditions:

$$-5.2<(R_{k2}-R_{m2})/f_e<37.6;$$

$$-4.3<(R_{41}-R_{82})/f_4<25;$$

$$1.15 \leq f_{34}/f_{67} \leq 1.80;$$

$$Vd2<30;$$

$$2.7 \leq TTL/R_{11} \leq 3.0;$$

$$0.65 \leq f/f_5 \leq 0.8;$$

$$48 \text{ mm} < f_1+f_4 < 108 \text{ mm};$$

$$-10 \text{ mm} < f_e-f_k < 10 \text{ mm};$$

$$50 \text{ mm} < f_1-f_k < 100 \text{ mm};$$

$$-2.2 < R_{k2}/(f_1+f_k) < 0.13;$$

$$0.4 < R_{11}/R_{12} < 0.8;$$

$$3.1 \text{ mm} < R_{11}+R_{31} < 12.2 \text{ mm};$$

$$-0.31 < R_{31}/f_1 < -0.13;$$

wherein $f_4$ is the effective focal length of the fourth lens, $R_{k2}$ is the radius of curvature of the image side surface of the lens second close to the image side, $f_1$ is the effective focal length of the first lens, $f_k$ is the effective focal length of the lens second close to the image side, $R_{m2}$ is the radius of curvature of the image side surface of the lens closest to the image side, $f_e$ is an effective focal length of the lens fifth close to the image side, $R_{41}$ is a radius of curvature of an object side surface of the fourth lens, $R_{82}$ is a radius of curvature of an image side surface of the eighth lens, $f_{34}$ is an effective focal length of a combination of the third lens and the fourth lens, $f_{67}$ is an effective focal length of a combination of the sixth lens and the seventh lens, Vd2 is an Abbe number of the second lens, $f_5$ is an effective focal length of the fifth lens, f is an effective focal length of the lens assembly, $R_{11}$ is a radius of curvature of an object side surface of the first lens, TTL is an interval from the object side surface of the first lens to an image plane along the optical axis, $R_{12}$ is a radius of curvature of an image side surface of the first lens, and $R_{31}$ is a radius of curvature of an object side surface of the third lens.

6. The lens assembly as claimed in claim 2, wherein:
the sixth lens is a meniscus lens and further comprises a concave surface facing the object side;
the seventh lens is a biconvex lens and comprises a convex surface facing the object side and another convex surface facing the image side; and
the eighth lens comprises a concave surface facing the object side.

7. The lens assembly as claimed in claim 6, further comprising a stop disposed between the fourth lens and the sixth lens, wherein:
the first lens comprises a convex surface facing the object side and a concave surface facing the image side;
the second lens is a meniscus lens and comprises a convex surface facing the object side;
the third lens is a biconcave lens and further comprises another concave surface facing the image side; and
the fourth lens comprises a convex surface facing the image side.

8. The lens assembly as claimed in claim 7, further comprising a tenth lens disposed between the fifth lens and the sixth lens, wherein the tenth lens is a biconcave lens with negative refractive power and comprises a concave surface facing the object side and another concave surface facing the image side.

9. The lens assembly as claimed in claim 8, wherein the lens assembly satisfies at least one of following conditions:

$$-5.2<(R_{k2}-R_{m2})/f_e<37.6;$$

$$-4.3<(R_{41}-R_{82})/f_4<25;$$

$$1.15 \leq f_{34}/f_{67} \leq 1.80;$$

$$Vd2<30;$$

$$2.7 \leq TTL/R_{11} \leq 3.0;$$

$$0.65 \leq f/f_5 \leq 0.8;$$

$$48 \text{ mm} < f+f_4 < 108 \text{ mm};$$

$$2.4 < TTL/f_r < 2.7;$$

$$-10 \text{ mm} < f_e-f_k < 10 \text{ mm};$$

$$50 \text{ mm} < f_1-f_k < 100 \text{ mm};$$

$$-2.2 < R_{k2}/(f_1+f_k) < 0.13;$$

$$0.4 < R_{11}/R_{12} < 0.8;$$

$$3.1 \text{ mm} < R_{11}+R_{31} < 12.2 \text{ mm};$$

$$-0.31 < R_{31}/f_1 < -0.13;$$

wherein $f_4$ is the effective focal length of the fourth lens, $R_{k2}$ is the radius of curvature of the image side surface of the lens second close to the image side, $f_1$ is the effective focal length of the first lens, $f_k$ is the effective focal length of the lens second close to the image side, $R_{m2}$ is the radius of curvature of the image side surface of the lens closest to the image side, $f_e$ is an effective focal length of the lens fifth close to the image side, $R_{41}$ is a radius of curvature of an object side surface of the fourth lens, $R_{82}$ is a radius of curvature of an image side surface of the eighth lens, $f_{34}$ is an effective focal length of a combination of the third lens and the fourth lens, $f_{67}$ is an effective focal length of a combination of the sixth lens and the seventh lens, Vd2 is an Abbe number of the second lens, $f_5$ is an effective focal length of the fifth lens, f is an effective focal length of the lens assembly, $R_{11}$ is a radius of curvature of an object side surface of the first lens, TTL is an interval from the object side surface of the first lens to an image plane along the optical axis, $f_r$ is an effective focal length of a combination of the tenth lens, the sixth lens, the seventh lens, the eighth lens, and the ninth lens, $R_{12}$ is a radius of curvature of an image side surface of the first lens, and $R_{31}$ is a radius of curvature of an object side surface of the third lens.

10. The lens assembly as claimed in claim 1, wherein:
the first lens comprises a convex surface facing the object side and a concave surface facing the image side;
the second lens is a meniscus lens and comprises a convex surface facing the object side;
the third lens is a biconcave lens and further comprises another concave surface facing the image side; and
the fourth lens comprises a convex surface facing the image side.

11. The lens assembly as claimed in claim 1, further comprising a stop disposed between the fourth lens and the sixth lens.

12. The lens assembly as claimed in claim 1, wherein the lens assembly satisfies at least one of following conditions:

$$-5.2<(R_{k2}-R_{m2})/f_e<37.6;$$

$$-4.3<(R_{41}-R_{82})/f_4<25;$$

$$1.15 \leq f_{34}/f_{67} \leq 1.80;$$

$$Vd2<30;$$

$$2.7 \leq TTL/R_{11} \leq 3.0;$$

$$0.65 \leq f/f_5 \leq 0.8;$$

$$48 \text{ mm} < f_1+f_4 < 108 \text{ mm};$$

$$-10 \text{ mm} < f_e-f_k < 10 \text{ mm};$$

$$50 \text{ mm} < f_1-f_k < 100 \text{ mm};$$

$$-2.2<R_{k2}/(f_1+f_k)<0.13;$$

$$0.4<R_{11}/R_{12}<0.8;$$

$$3.1 \text{ mm} < R_{11}+R_{31} < 12.2 \text{ mm};$$

$$-0.31<R_{31}/f_1<-0.13;$$

wherein $f_4$ is the effective focal length of the fourth lens, $R_{k2}$ is the radius of curvature of the image side surface of the lens second close to the image side, $f_1$ is the effective focal length of the first lens, $f_k$ is the effective focal length of the lens second close to the image side, $R_{m2}$ is the radius of curvature of the image side surface of the lens closest to the image side, $f_e$ is an effective focal length of the lens fifth close to the image side, $R_{41}$ is a radius of curvature of an object side surface of the fourth lens, $R_{82}$ is a radius of curvature of an image side surface of the eighth lens, $f_{34}$ is an effective focal length of a combination of the third lens and the fourth lens, $f_{67}$ is an effective focal length of a combination of the sixth lens and the seventh lens, Vd2 is an Abbe number of the second lens, $f_5$ is an effective focal length of the fifth lens, f is the effective focal length of the lens assembly, $R_{11}$ is a radius of curvature of an object side surface of the first lens, TTL is the interval from the object side surface of the first lens to an image plane along the optical axis, $R_{12}$ is a radius of curvature of an image side surface of the first lens, and $R_{31}$ is a radius of curvature of an object side surface of the third lens.

13. The lens assembly as claimed in claim 1, wherein the lens assembly satisfies at least one of following conditions:

$$-5.2<(R_{k2}-R_{m2})/f_e<37.6;$$

$$-4.3<(R_{41}-R_{82})/f_4<25;$$

$$1.15 \leq f_{34}/f_{67} \leq 1.80;$$

$$Vd2<30;$$

$$2.7 \leq TTL/R_{11} \leq 3.0;$$

$$0.65 \leq f/f_5 \leq 0.8;$$

$$48 \text{ mm} < f_1+f_4 < 108 \text{ mm};$$

$$-10 \text{ mm} < f_e-f_k < 10 \text{ mm};$$

$$50 \text{ mm} < f_1-f_k < 100 \text{ mm};$$

$$-2.2<R_{k2}/(f_1+f_k)<0.13;$$

$$0.4<R_{11}/R_{12}<0.8;$$

$$3.1 \text{ mm} < R_{11}+R_{31} < 12.2 \text{ mm};$$

$$-0.31<R_{31}/f_1<-0.13;$$

wherein $f_4$ is the effective focal length of the fourth lens, $R_{k2}$ is the radius of curvature of the image side surface of the lens second close to the image side, f1 is the effective focal length of the first lens, $f_k$ is the effective focal length of the lens second close to the image side, $R_{m2}$ is the radius of curvature of the image side surface of the lens closest to the image side, $f_e$ is an effective focal length of the lens fifth close to the image side, $R_{41}$ is a radius of curvature of an object side surface of the fourth lens, $R_{82}$ is a radius of curvature of an image side surface of the eighth lens, f34 is an effective focal length of a combination of the third lens and the fourth lens, $f_{67}$ is an effective focal length of a combination of the sixth lens and the seventh lens, Vd2 is an Abbe number of the second lens, $f_5$ is an effective focal length of the fifth lens, f is an effective focal length of the lens assembly, $R_{11}$ is a radius of curvature of an object side surface of the first lens, TTL is an interval from the object side surface of the first lens to an image plane along the optical axis, $R_{12}$ is a radius of curvature of an image side surface of the first lens, and $R_{31}$ is a radius of curvature of an object side surface of the third lens.

14. A lens assembly comprising:
a first lens which is a meniscus lens with refractive power;
a second lens which is with refractive power and comprises a concave surface facing an image side;
a third lens which is with negative refractive power and comprises a concave surface facing an object side;
a fourth lens which is with positive refractive power;
a fifth lens which is with positive refractive power and comprises a convex surface facing the object side;
a sixth lens which is with positive refractive power and comprises a convex surface facing the image side;
a seventh lens which is with refractive power;
an eighth lens which is with refractive power and comprises a convex surface facing the image side; and
a ninth lens which is with positive refractive power and comprises a convex surface facing the object side;
wherein the refractive power of the first lens and the refractive power of the second lens are opposite in sign;
wherein the first lens, the second lens, the third lens, the fourth lens, the fifth lens, the sixth lens, the seventh lens, the eighth lens, and the ninth lens are arranged in order from the object side to the image side along an optical axis;
wherein the lens assembly satisfies at least one of following conditions:

$Vd4 > 35$;

$10 \text{ mm} < f_4 - R_{k2} < 56.5 \text{ mm}$;

wherein Vd4 is an Abbe number of the fourth lens, $f_4$ is an effective focal length of the fourth lens, $R_{k2}$ is a radius of curvature of an image side surface of the lens second close to the image side;
wherein the lens assembly satisfies following conditions:

$-22 < (R_{m2} + f_1)/f_k < -1$;

wherein $f_1$ is an effective focal length of the first lens, $f_k$ is an effective focal length of the lens second close to the image side, and $R_{m2}$ is a radius of curvature of an image side surface of the lens closest to the image side;
wherein an air gap is disposed between the sixth lens and the seventh lens;
wherein the lens assembly further comprises a tenth lens disposed between the fifth lens and the sixth lens, wherein the tenth lens is a biconcave lens and comprises a concave surface facing the object side and another concave surface facing the image side.

15. A lens assembly consisting of:
a first lens which is a meniscus lens with refractive power;
a second lens which is with refractive power;
a third lens which is with negative refractive power and comprises a concave surface facing an object side;
a fourth lens which is with positive refractive power;
a fifth lens which is with positive refractive power and comprises a convex surface facing the object side;
a sixth lens which is with positive refractive power and comprises a concave surface facing the object side and a convex surface facing an image side;
a seventh lens which is with refractive power and comprises a convex surface facing the object side;
an eighth lens which is with refractive power; and
a ninth lens which is with positive refractive power and comprises a convex surface facing the object side;
wherein the first lens, the second lens, the third lens, the fourth lens, the fifth lens, the sixth lens, the seventh lens, the eighth lens, and the ninth lens are arranged in order from the object side to the image side along an optical axis;
wherein an air gap is disposed between the sixth lens and the seventh lens;
wherein the lens assembly satisfies at least one of following conditions:

$3.0 \leq TTL/f \leq 3.8$;

$0.65 \leq f/f_5 \leq 0.8$;

$48 \text{ mm} < f_1 + f_4 < 108 \text{ mm}$;

$-10 \text{ mm} < f_e - f_k < 10 \text{ mm}$;

wherein f is an effective focal length of the lens assembly, $f_1$ is an effective focal length of the first lens, $f_4$ is an effective focal length of the fourth lens, $f_5$ is an effective focal length of the fifth lens, $f_e$ is an effective focal length of the lens fifth close to the image side, $f_k$ is an effective focal length of the lens second close to the image side, and TTL is an interval from an object side surface of the first lens to an image plane along the optical axis.

16. A lens assembly consisting of:
a first lens which is a meniscus lens with refractive power;
a second lens which is with refractive power;
a third lens which is with negative refractive power and comprises a concave surface facing an object side;
a fourth lens which is with positive refractive power;
a fifth lens which is with positive refractive power and comprises a convex surface facing the object side;
a sixth lens which is with positive refractive power and comprises a concave surface facing the object side and a convex surface facing an image side;
a seventh lens which is with refractive power;
an eighth lens which is with refractive power and comprises a concave surface facing the object side; and
a ninth lens which is with positive refractive power and comprises a convex surface facing the object side;
wherein the first lens, the second lens, the third lens, the fourth lens, the fifth lens, the sixth lens, the seventh lens, the eighth lens, and the ninth lens are arranged in order from the object side to the image side along an optical axis;
wherein an air gap is disposed between the sixth lens and the seventh lens;
wherein the lens assembly satisfies at least one of following conditions:

$3.0 \leq TTL/f \leq 3.8$;

$0.65 \leq f/f_5 \leq 0.8$;

$48 \text{ mm} < f_1 + f_4 < 108 \text{ mm}$;

$-10 \text{ mm} < f_e - f_k < 10 \text{ mm}$;

wherein f is an effective focal length of the lens assembly, $f_1$ is an effective focal length of the first lens, $f_4$ is an effective focal length of the fourth lens, $f_5$ is an effective focal length of the fifth lens, $f_e$ is an effective focal length of the lens fifth close to the image side, $f_k$ is an effective focal length of the lens second close to the image side, and TTL is an interval from an object side surface of the first lens to an image plane along the optical axis.

* * * * *